June 3, 1952  E. H. PRAEGER  2,598,830
APPARATUS FOR MOLDING CONCRETE WALLS
Filed Dec. 29, 1949  14 Sheets-Sheet 3

INVENTOR.
EMIL H. PRAEGER
BY John Farley
ATTORNEY.

June 3, 1952 E. H. PRAEGER 2,598,830
APPARATUS FOR MOLDING CONCRETE WALLS
Filed Dec. 29, 1949 14 Sheets-Sheet 6

INVENTOR.
EMIL H. PRAEGER
BY
John Farley
ATTORNEY.

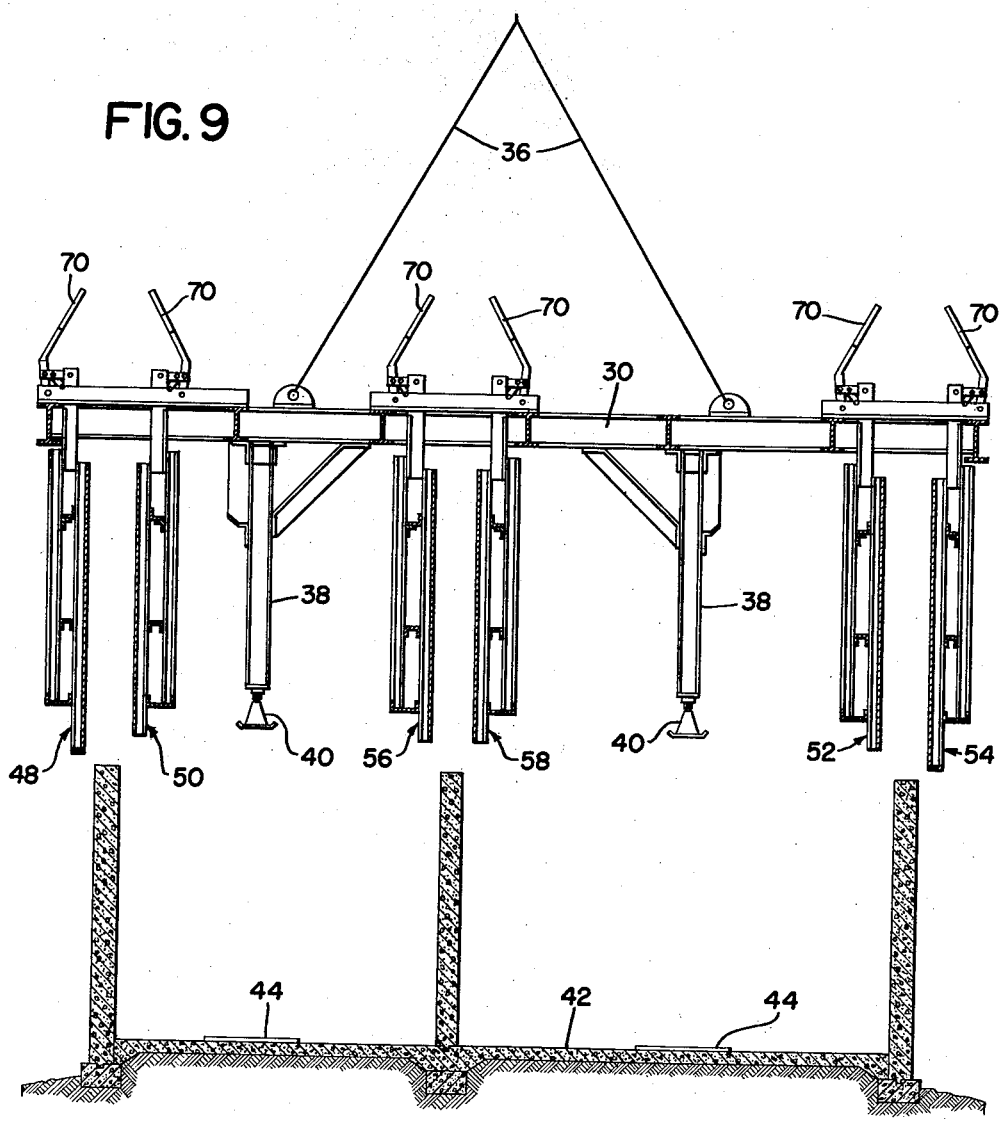

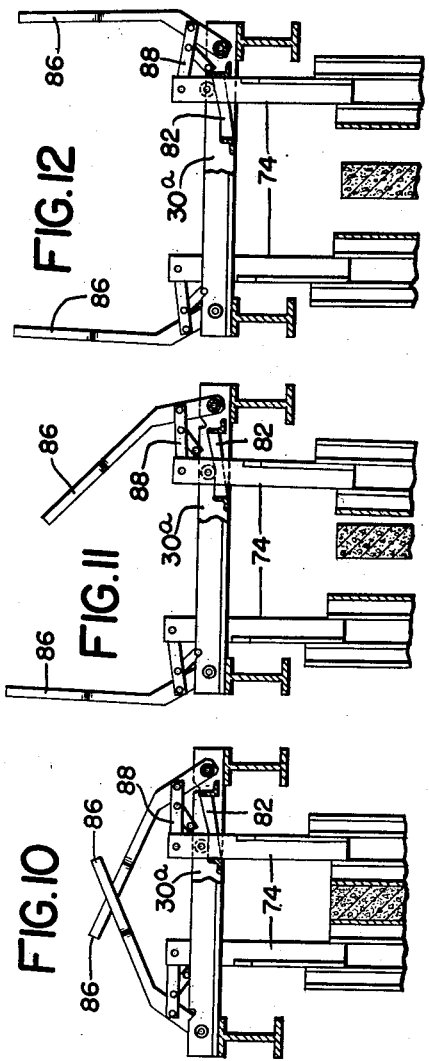
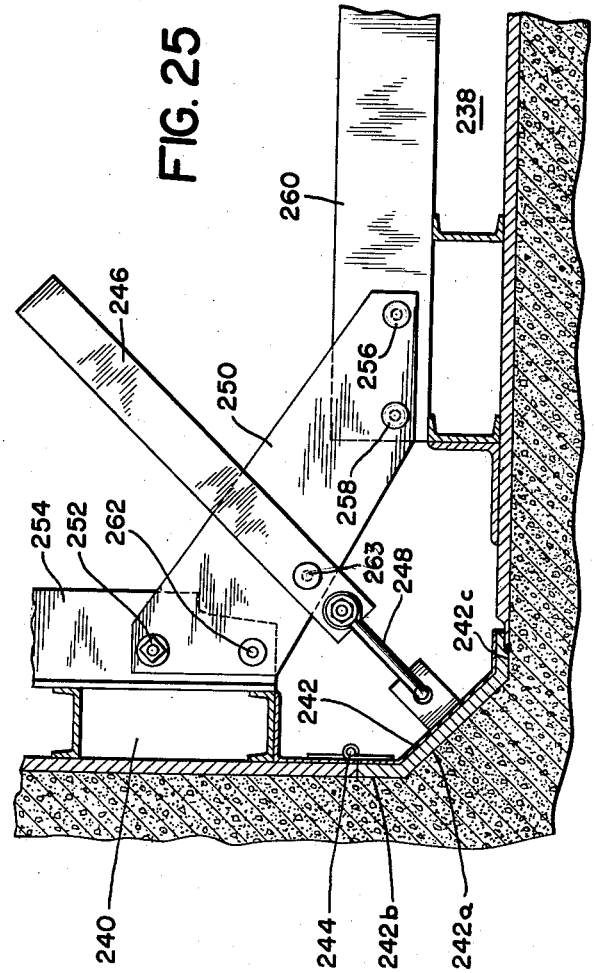
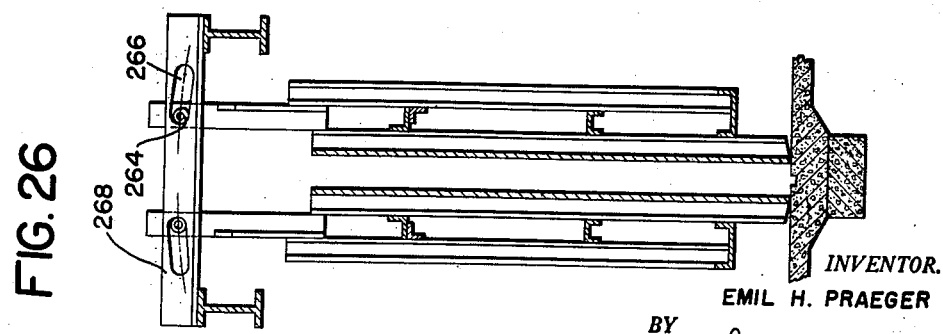

June 3, 1952    E. H. PRAEGER    2,598,830
APPARATUS FOR MOLDING CONCRETE WALLS
Filed Dec. 29, 1949    14 Sheets-Sheet 9

*INVENTOR.*
EMIL H. PRAEGER
BY John Farley
ATTORNEY.

June 3, 1952   E. H. PRAEGER   2,598,830
APPARATUS FOR MOLDING CONCRETE WALLS
Filed Dec. 29, 1949   14 Sheets-Sheet 10
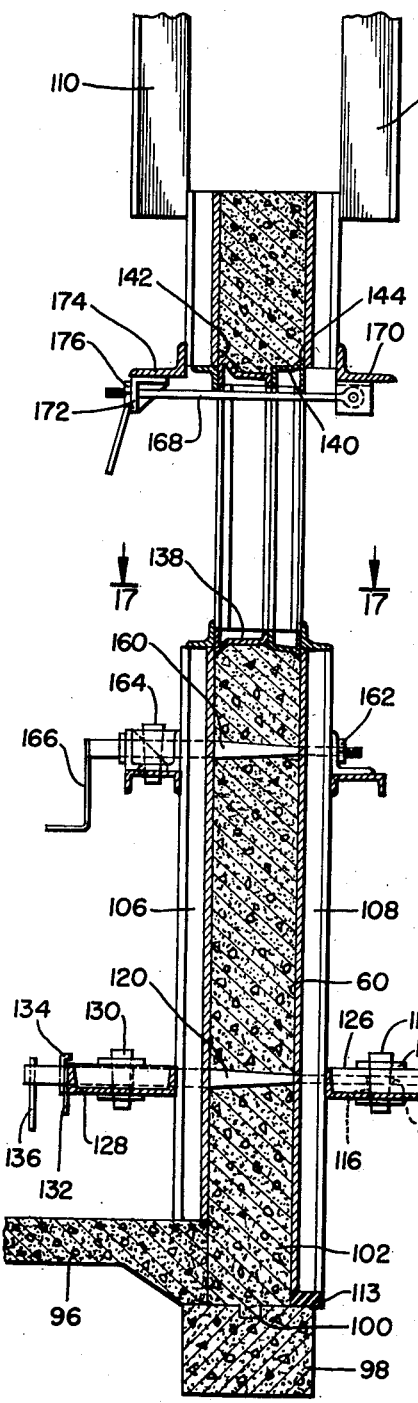
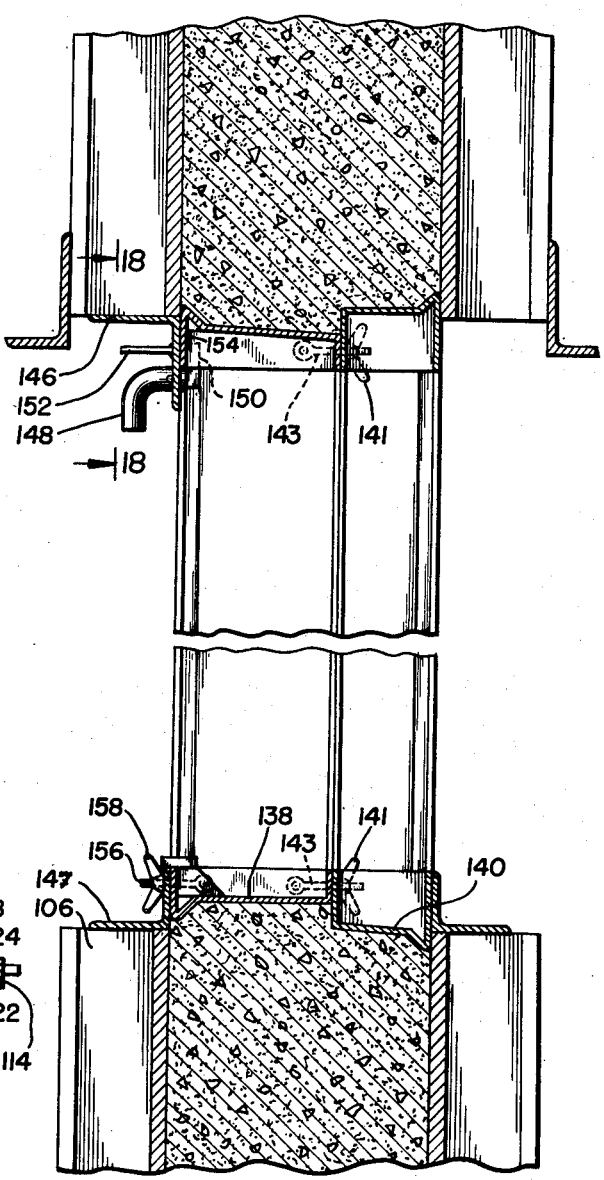
INVENTOR.
EMIL H. PRAEGER
BY
John Farley
ATTORNEY.

June 3, 1952 E. H. PRAEGER 2,598,830
APPARATUS FOR MOLDING CONCRETE WALLS
Filed Dec. 29, 1949 14 Sheets-Sheet 11
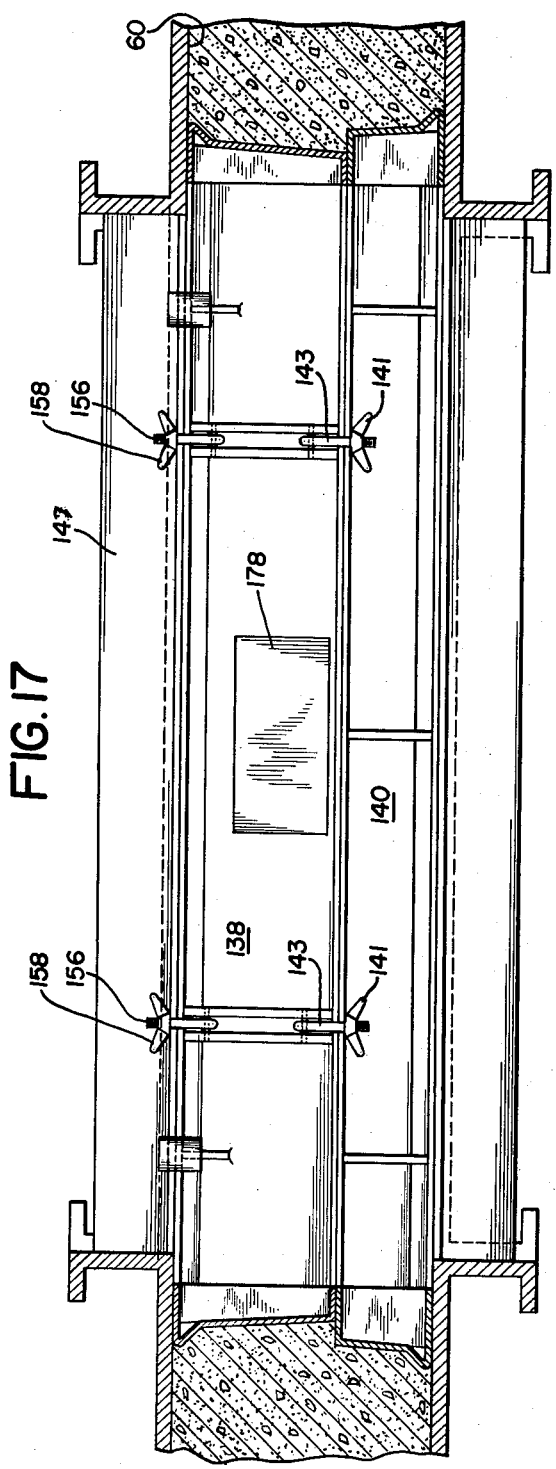
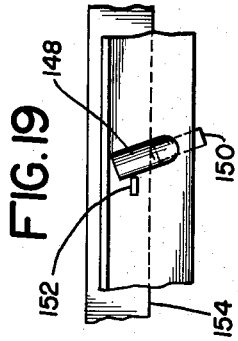
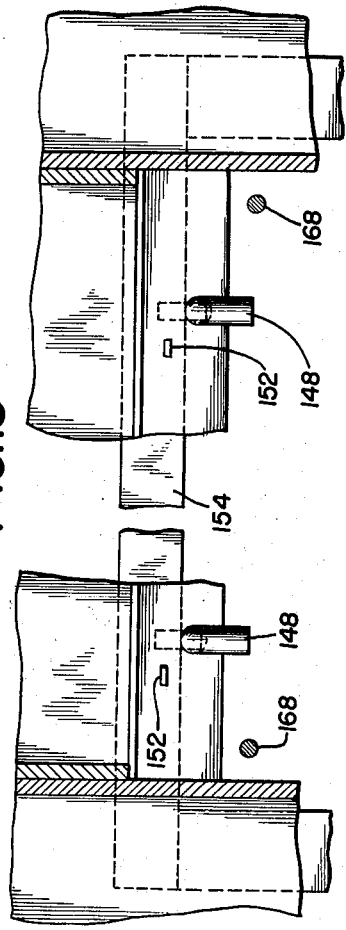
INVENTOR.
EMIL H. PRAEGER
BY John Farley
ATTORNEY.

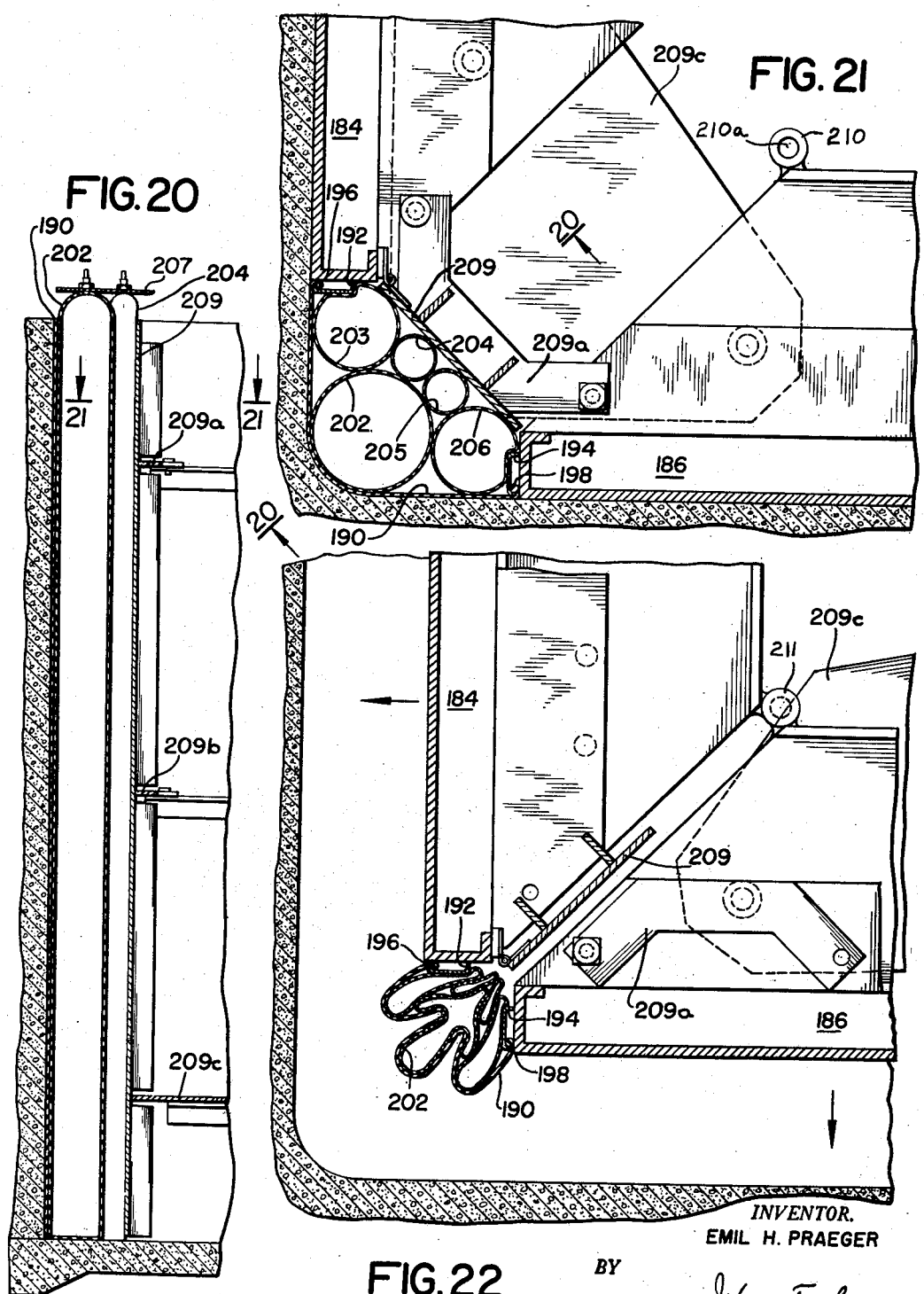

June 3, 1952           E. H. PRAEGER           2,598,830
APPARATUS FOR MOLDING CONCRETE WALLS
Filed Dec. 29, 1949           14 Sheets-Sheet 13

*INVENTOR.*
*EMIL H. PRAEGER*
BY
*John Farley*
ATTORNEY

June 3, 1952  E. H. PRAEGER  2,598,830
APPARATUS FOR MOLDING CONCRETE WALLS
Filed Dec. 29, 1949  14 Sheets-Sheet 14

INVENTOR.
EMIL H. PRAEGER
BY John Farley
ATTORNEY

Patented June 3, 1952

2,598,830

UNITED STATES PATENT OFFICE 2,598,830

APPARATUS FOR MOLDING CONCRETE WALLS

Emil H. Praeger, Brooklyn, N. Y., assignor to Ibec Housing Corporation, New York, N. Y., a corporation of New York Application December 29, 1949, Serial No. 135,566

10 Claims. (Cl. 25—131)

This invention relates to a machine for casting the walls of buildings, and particularly for casting, from concrete or the like, sets of walls for a large number of similar small buildings on nearby sites.

An object of the present invention is to construct walls for buildings efficiently and economically. With the present invention it is possible to form, in a single casting operation, a complete set of exterior walls for a building. Also, if desired, interior partitions for the building may be formed in a single casting operation with the exterior walls. The present invention makes it possible to form, at a rapid rate, similar sets of walls, all conforming with the same floor plan, on different sites, without the necessity of repeating in detail the work of laying out the floor plan anew on each site.

In one embodiment of the invention there is provided a wall-casting machine which may be positioned over successive sites where walls are desired. After one set of walls is formed, the machine may be lifted as a unit by a crane or the like and transported from one site to another. The machine may be provided with an elevated frame or platform, opposed wall forms or panels movably suspended from the frame, and standards or legs, which may terminate at their lower ends in screw jackets, adapted to support the frame when it is set on a site. The frame may be considered to comprise a jig or pattern which performs a number of functions: first, it automatically properly orients the wall forms so that they generally conform with a predetermined floor plan, thereby eliminating the necessity for laying out each building anew; second, it determines paths of movement for the forms, toward one another to a casting position and away from one another to a stripped or open position, serving to guide the forms along these predetermined paths; third, it determines the location of the casting and open positions of the forms; and fourth, it serves as a unitary support for the forms, and other parts of the machine, whereby the moving parts may be manipulated with respect to this support and whereby the entire machine may be lifted, transported, and lowered as a unit with the aid of this support.

For suspending the forms from the frame, there are provided means, such as cam-and-follower means, adapted to allow the forms to be moved toward one another to the casting position and away from one another to the stripped position, while always remaining connected to the frame. The stripped or open position may also aptly be termed a released position. In stripping the forms from the walls, the upper edges of the forms are stripped before the lower portions are stripped. This motion may be provided by the cam-and-follower means which suspend the forms, as will be more fully explained at a subsequent point. The wall forms include outer wall forms, which form the outer surfaces of the walls, and inner wall forms which form the inner surfaces of the walls. Special corner forms are provided for forming the interior corners of the walls. These corner forms are stripped from the cast concrete prior to stripping the inner wall forms in order to allow the inner wall forms to be moved to the stripped position without interfering with one another.

The above-mentioned, as well as other objects, together with the many advantages obtainable by the practice of the present invention, will be readily comprehended by persons skilled in the art by reference to the following detailed description taken in connection with the annexed drawings which respectively describe and illustrate a preferred embodiment of the invention, and wherein Fig. 1 is an end elevational view of wall-forming apparatus which has been lowered onto a foundation slab. The inner and outer members of the apparatus are in closed position, for retaining concrete therein.

Fig. 2 is a plan view of the apparatus shown in Fig. 1, as seen from above, in the same closed position, showing concrete therein. The viewpoint of Fig. 1 with respect to Fig. 2 is indicated at 1—1 in Fig. 2. It may be observed that Fig. 2 is on a somewhat smaller scale than Fig. 1.

Figs. 5–9 are schematic vertical sectional views of the apparatus, showing progressive stages in a pouring operation. The position of the sectional plane in Figs. 5-9 is indicated at 7—7 in Fig. 2.

Figure 5:
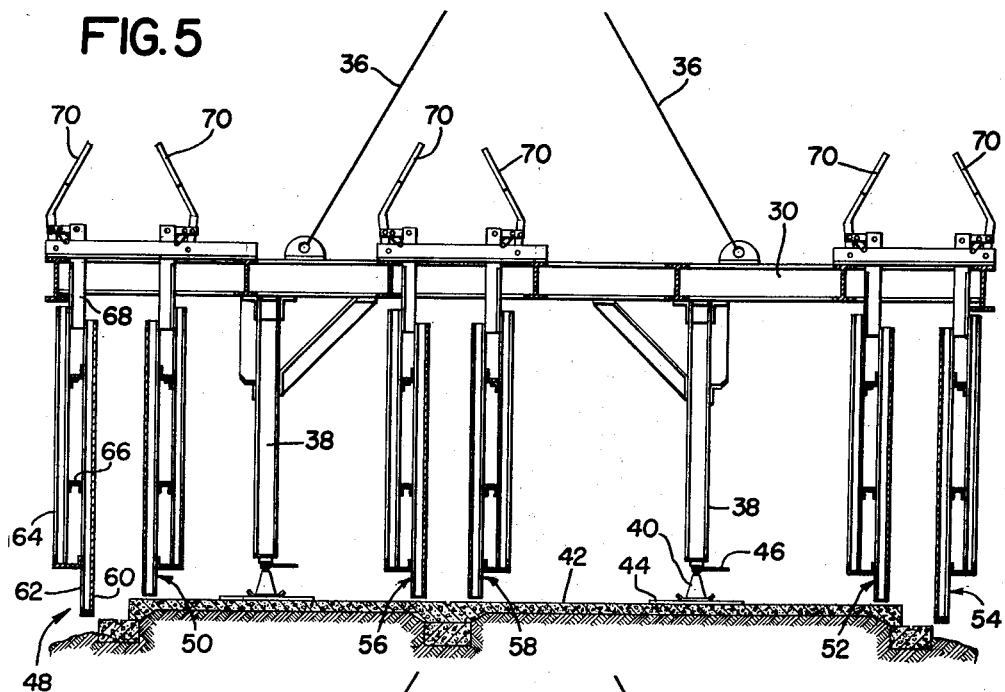

In Fig. 5, the forms are open.

Figure 6:
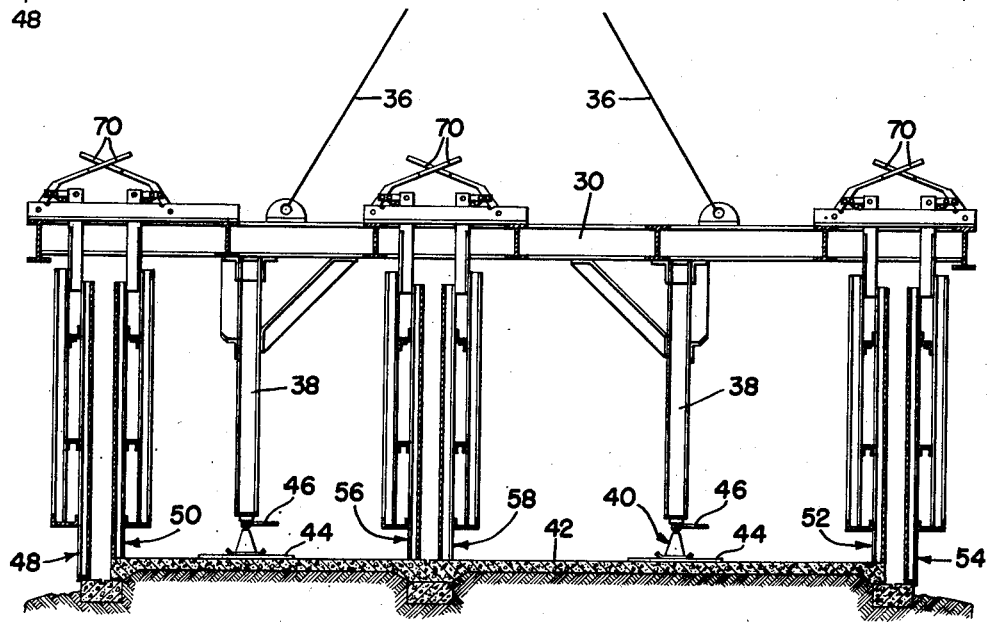

In Fig. 6, the forms are closed, preparatory to pouring concrete into them.

Figure 7:
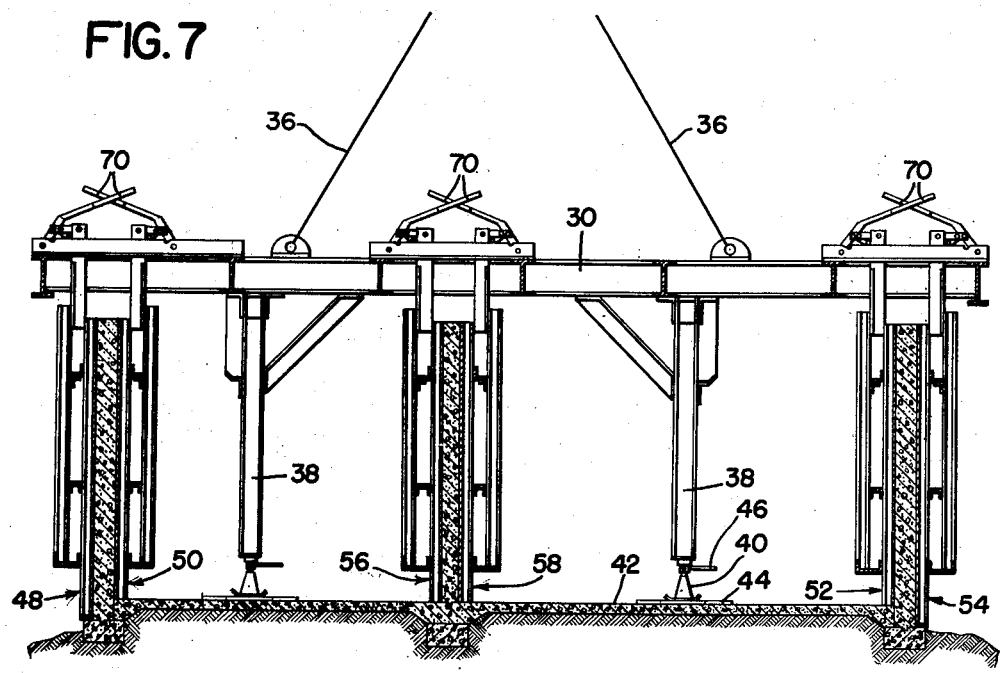

In Fig. 7, the forms are closed, and concrete has been poured into them.

Figure 8:
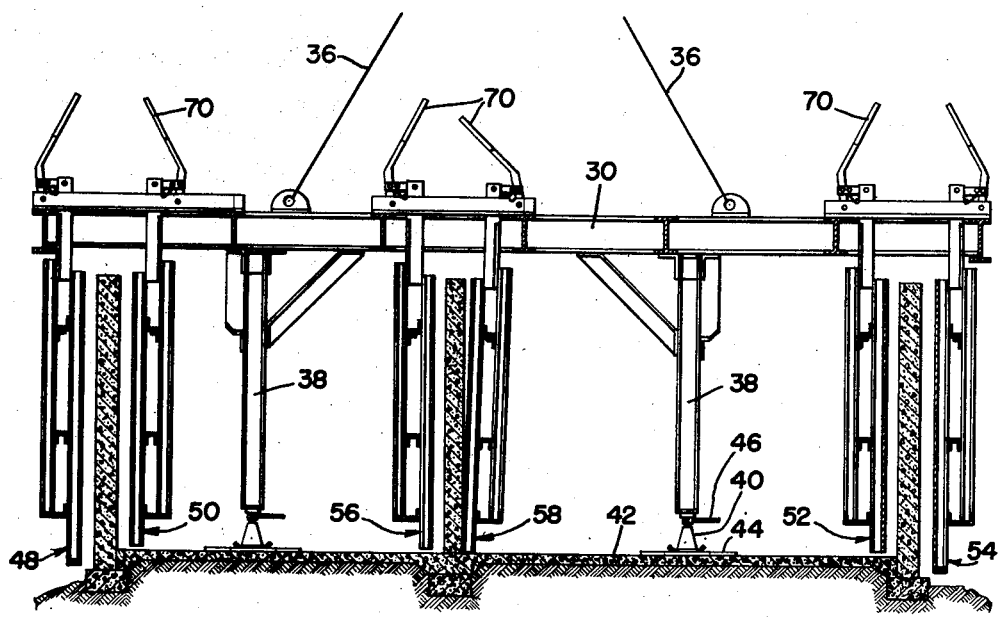

In Fig. 8, the forms have been opened or moved apart, with the exception of the right-hand center one, which has been only partly moved toward the open position.

In Fig. 9 the forms have been lifted above the walls.

Figs. 10-12 are vertical sectional views showing, in different positions, mechanism for moving the opposed wall forms toward and away from one another, similar to a portion of that shown in Figs. 5-9, drawn to a somewhat larger scale.

Figure 13:
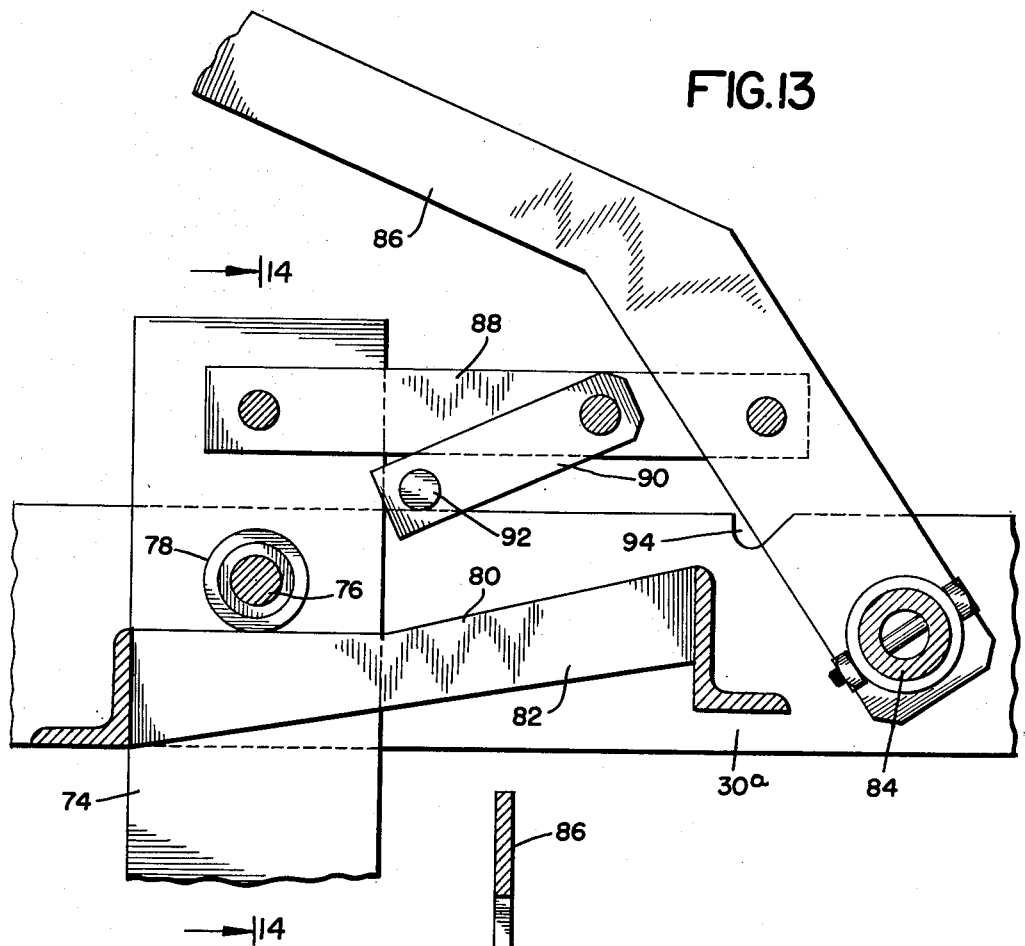

Fig. 13 is an enlarged view of a portion of Fig. 10, showing details of the mechanism for moving the wall forms.

Figure 14:
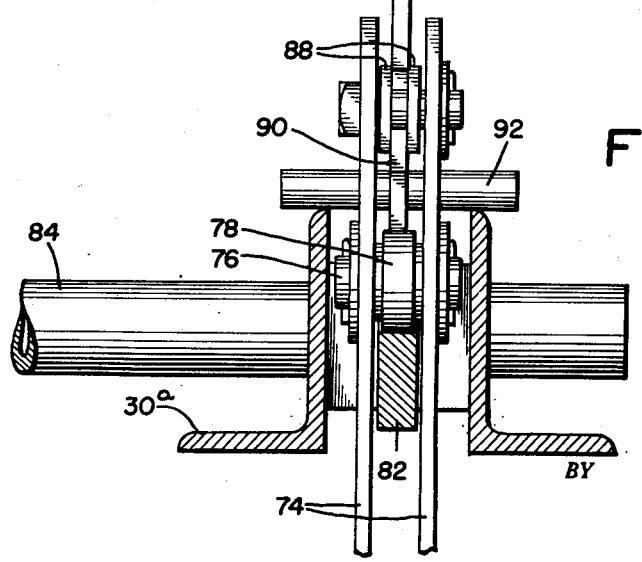

Fig. 14 is a vertical sectional view of the mechanism shown in Fig. 13, the position of the sectional plane being indicated at 14—14 in Fig. 13.

Figure 3:
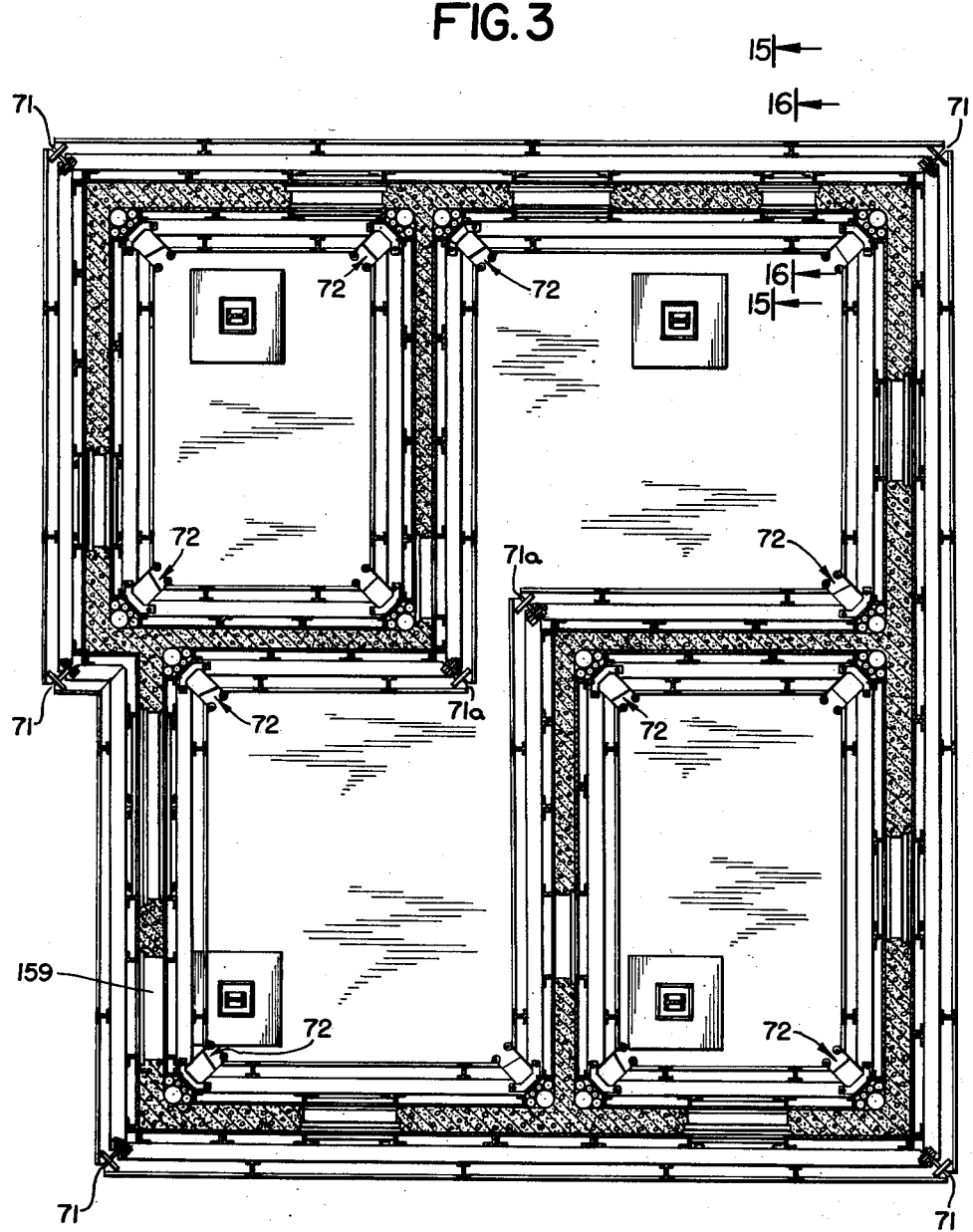
Fig. 3 is a horizontal sectional view of the apparatus of Figs. 1 and 2, in closed position, the position of the sectional plane being indicated at 3—3 in Fig. 1. The window forms, which appear as a part of Fig. 3, are shown as seen from immediately above them rather than in true section.

Fig. 15 is a vertical sectional view extending perpendicularly through a wall and the apparatus for forming same, at the position of a window frame, the position of the sectional plane being shown at 15—15 in Fig. 3.

Fig. 16 is an enlarged vertical sectional view through the same wall, apparatus, and window frame at a different sectional plane, certain portions of the frame being broken away, the position of the sectional plane being shown at 16—16 in Fig. 3.

Fig. 17 is a horizontal sectional view through the same window frame and a portion of the wall, the position of the sectional plane being indicated at 17—17 in Fig. 15.

Fig. 18 is a vertical sectional view, featuring the mechanism for locking the window frame in place, the position of the sectional plane being indicated at 18—18 in Fig. 16. In Fig. 18 the locking mechanism is shown in locked position.

Fig. 19 is a view similar to Fig. 18, but with the locking mechanism shown in unlocked position.

Fig. 20 is a vertical sectional view through a portion of a wall and an inflatable corner form of the same type as that shown in Fig. 3. The position of the sectional plane is indicated at 20—20 in Fig. 21.

Fig. 21 is a horizontal sectional view through an interior corner of a wall, featuring an inflatable corner form of the type shown in Fig. 20, inflated, with the apparatus in position against the wall. The position of the sectional plane is indicated at 21—21 in Fig. 20. Fig. 21 is drawn to a larger scale than Fig. 20.

Fig. 22 is a horizontal sectional view of the elements shown in Fig. 21, but with the inflatable bladders of the corner form deflated, and the inner wall forms in stripped position, that is, moved back from the wall.

Figure 23:
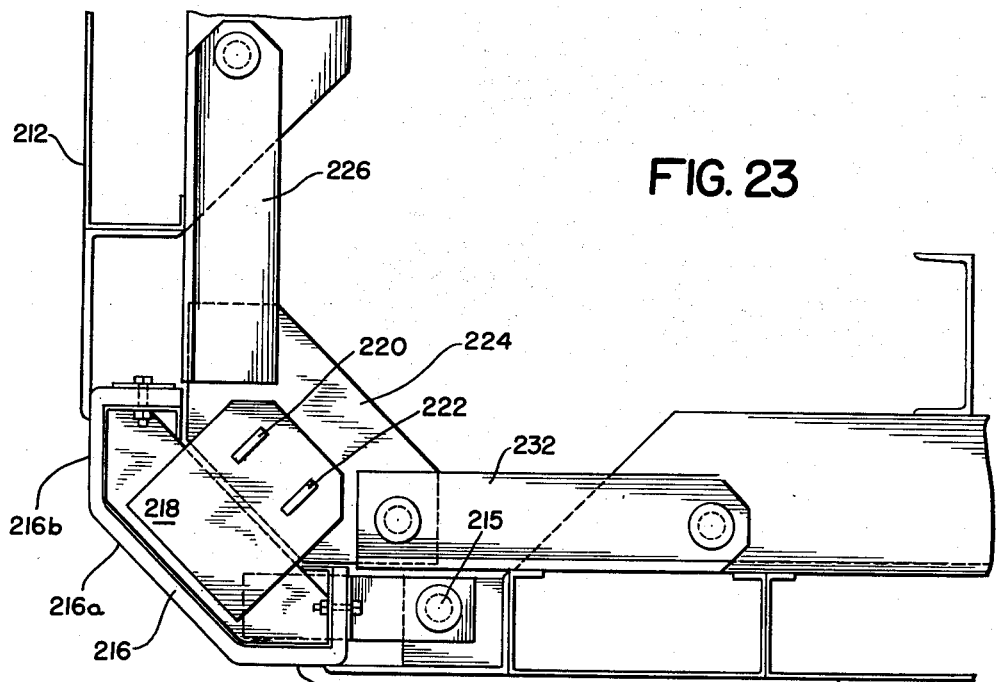
Figure 24:
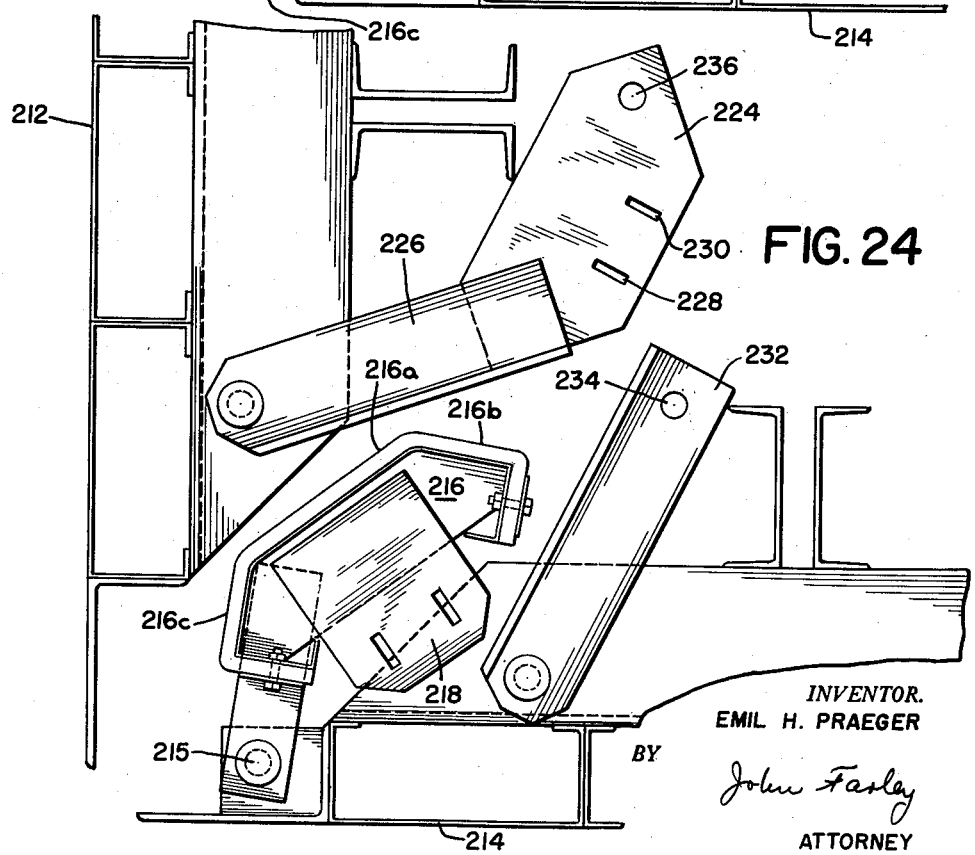

Figs. 23 and 24 show a variation of the apparatus utilizing, instead of the inflatable corner form, a different type of corner form, as seen in plan view from above, certain upper portions of the apparatus being omitted. In Fig. 23 the corner form and the inner wall forms are in casting position, for retaining walls (not shown). In Fig. 24 the corner form has been swung back from the corner of the wall, and the inner wall forms have been stripped from the walls and moved to an open position.

Fig. 25 shows still another type of corner form, as seen in horizontal section.

Figure 27:
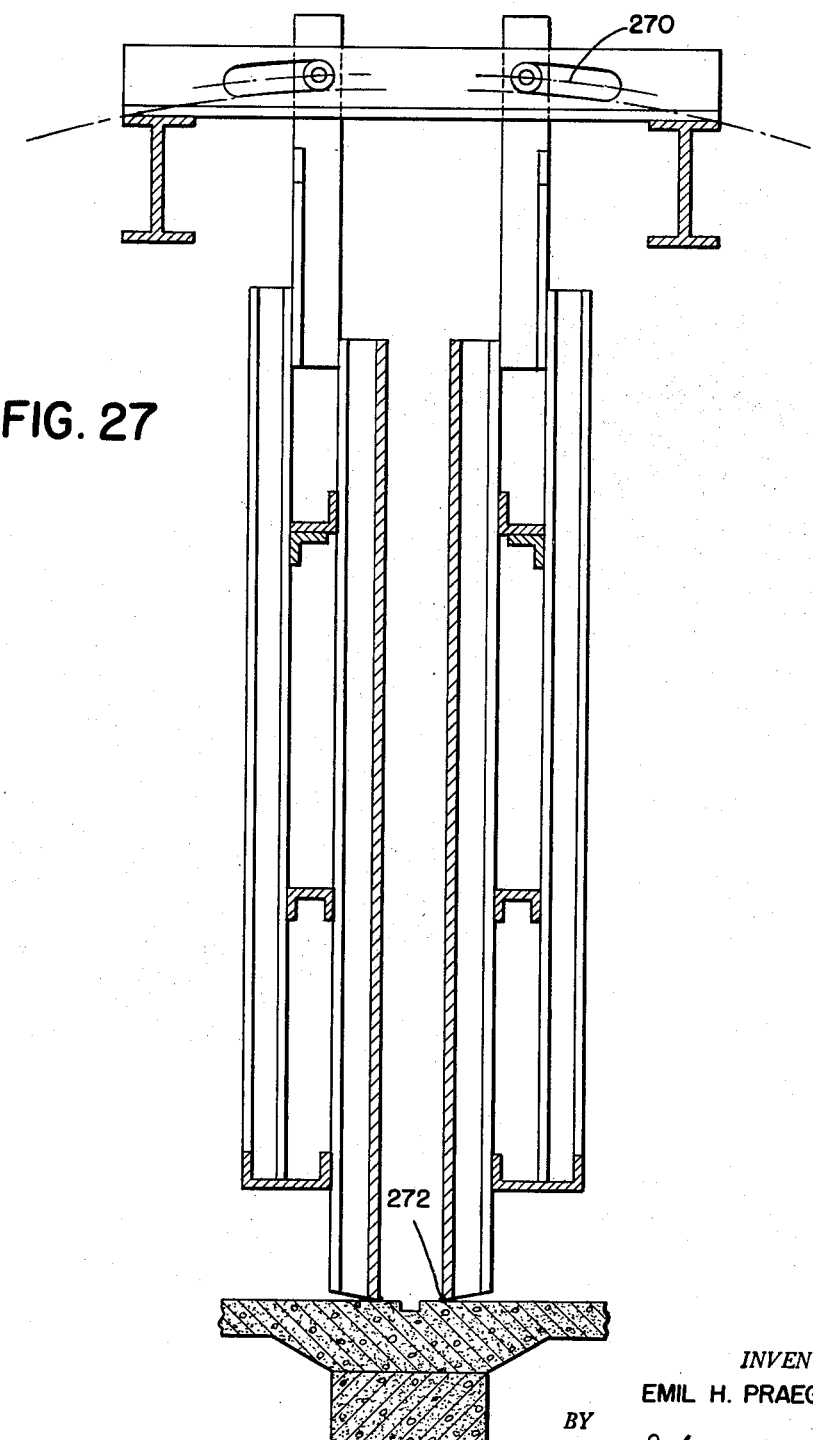

Figs. 26 and 27 show cam-and-follower mechanisms for suspending the wall forms from the movable frame, representing variations from that shown in Figs. 5-14.

Figure 1:
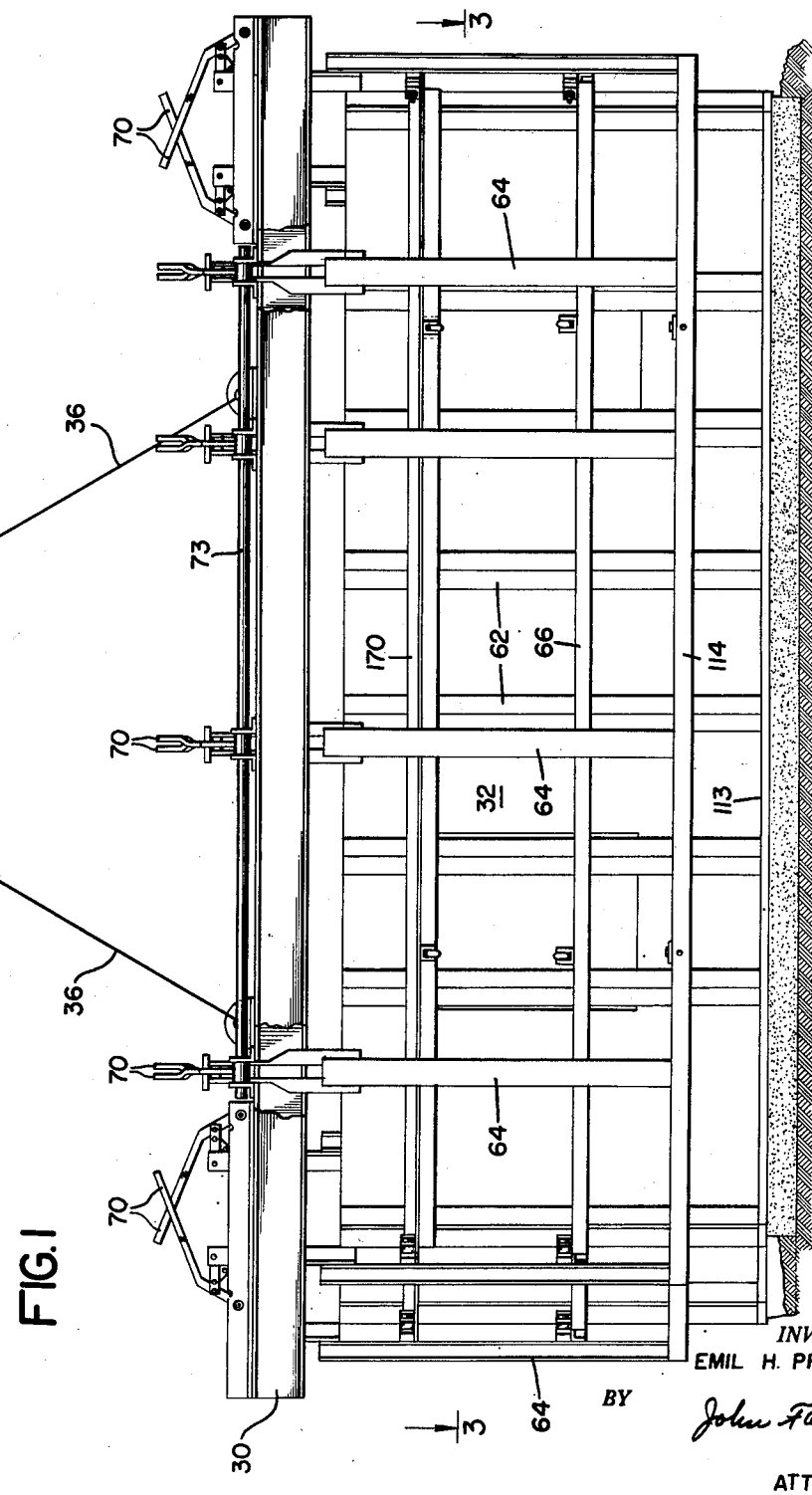

Turning now to Fig. 1, there is shown, in end elevation, a wall-casting machine including a movable frame 30 from which there is suspended, by mechanism to be described, a series of wall forms, an outer one of which, 32, may be seen in Fig. 1 along with its horizontal walers and vertical framing. As may be seen in Fig. 4, a single wall form extends horizontally across an entire flat surface of the walls; that is, for example, the form 32 extends horizontally across the entire end of the proposed building. Likewise, as may be seen in Fig. 5, the individual forms extend the entire height of the walls.

Returning now to Fig. 1, the movable frame 30 is suspended, as from a crane, not shown, by cables 36, attached to suitable apertured members affixed to the frame 30.

The frame 30, in addition to providing a common support from which the forms or panels such as 32 are movably suspended, serves, as previously explained, as a jig for guiding the forms and also serves as a working platform on which workmen may stand in pouring concrete into the forms or in manipulating the forms. Apparatus to aid in the pouring operation may also be supported by the frame 30.

Figure 4:
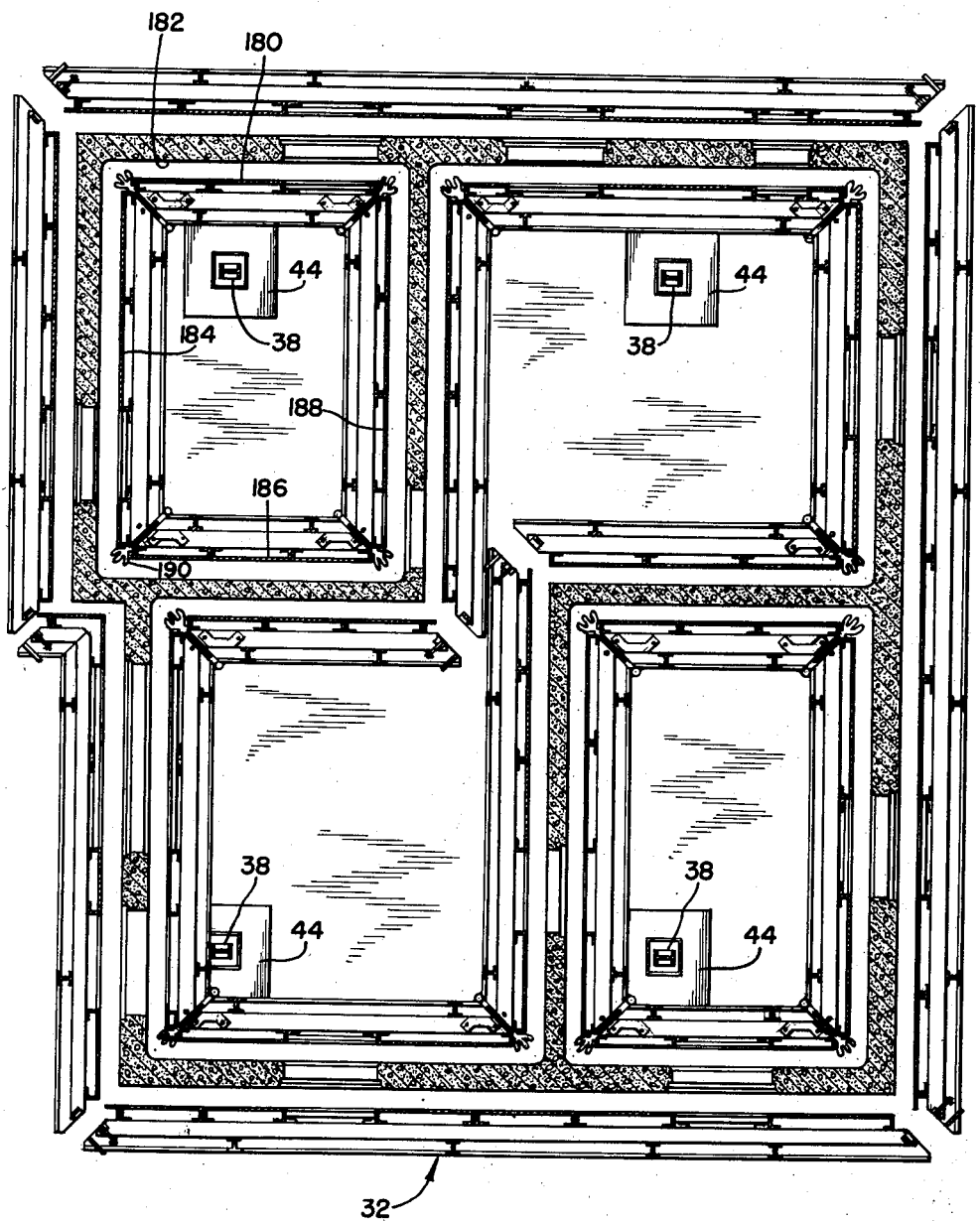
Fig. 4 is a horizontal sectional view of the apparatus of Figs. 1–3, differing from Fig. 3 in that now the forms are shown in open or stripped position, their inner and outer members having been moved away from one another, thereby being retracted from the concrete walls. The position of the sectional plane for Fig. 4 is the same as that for Fig. 3.

The entire assembly of forms is connected, directly or indirectly, to the frame 30; and a moving crane may, by the cables 36, lift the frame 30 and transport it, along with the forms suspended therefrom, to successive sites. When the frame 30 is first lowered onto a site, it and the remainder of the assembly are supported solely by the cables 36. The frame however, is provided with downwardly-extending standards, such as 38, as best shown in Fig. 5, and as also indicated in Fig. 4. These standards terminate at their lower end in screw jacks 40. When the apparatus is first lowered onto a foundation slab 42, it may be assumed that there is placed underneath each screw jack 40 a weight-distributing plate 44. The screw jacks are initially set, by means of handles such as 46, to an extended position, so that they, together with the standards, support the frame 30 at a great enough elevation so that the forms swing clear of the foundation or ground.

In Fig. 5, there are shown, in cross section, a series of wall forms. The pair of forms on the left, 48 and 50, and the pair on the right, 52 and 54, serve the purpose of forming exterior walls for the proposed building, and the pair of forms toward the center, 56 and 58, serve the purpose of forming an interior partition for the building.

A typical wall form, such as 48, has a flat inner face 60 of suitable generally smooth material. This material may, for example, in some cases be of metal, or in case it is desired to use a porous material so that a vacuum may be applied, a screen-like material may be used. A variety of other types of material may also be employed.

The wall forms are provided with suitable members for mechanical rigidity, such as vertical framing members 62 and 64 and horizontal walers 66.

The forms are carried by vertically-extending hangers such as 68. Means will presently be described whereby the hangers in turn are carried by the frame 30, and whereby the hangers may be moved along predetermined paths, in order to move the forms to casting and stripped positions. At the present point it may be stated that there is associated with each form one or more levers such as 70 which when moved, are capable of moving the forms generally toward the walls, or toward the space where the wall is to be cast, or away therefrom. Further details of this movement will be subsequently explained.

Figure 2:
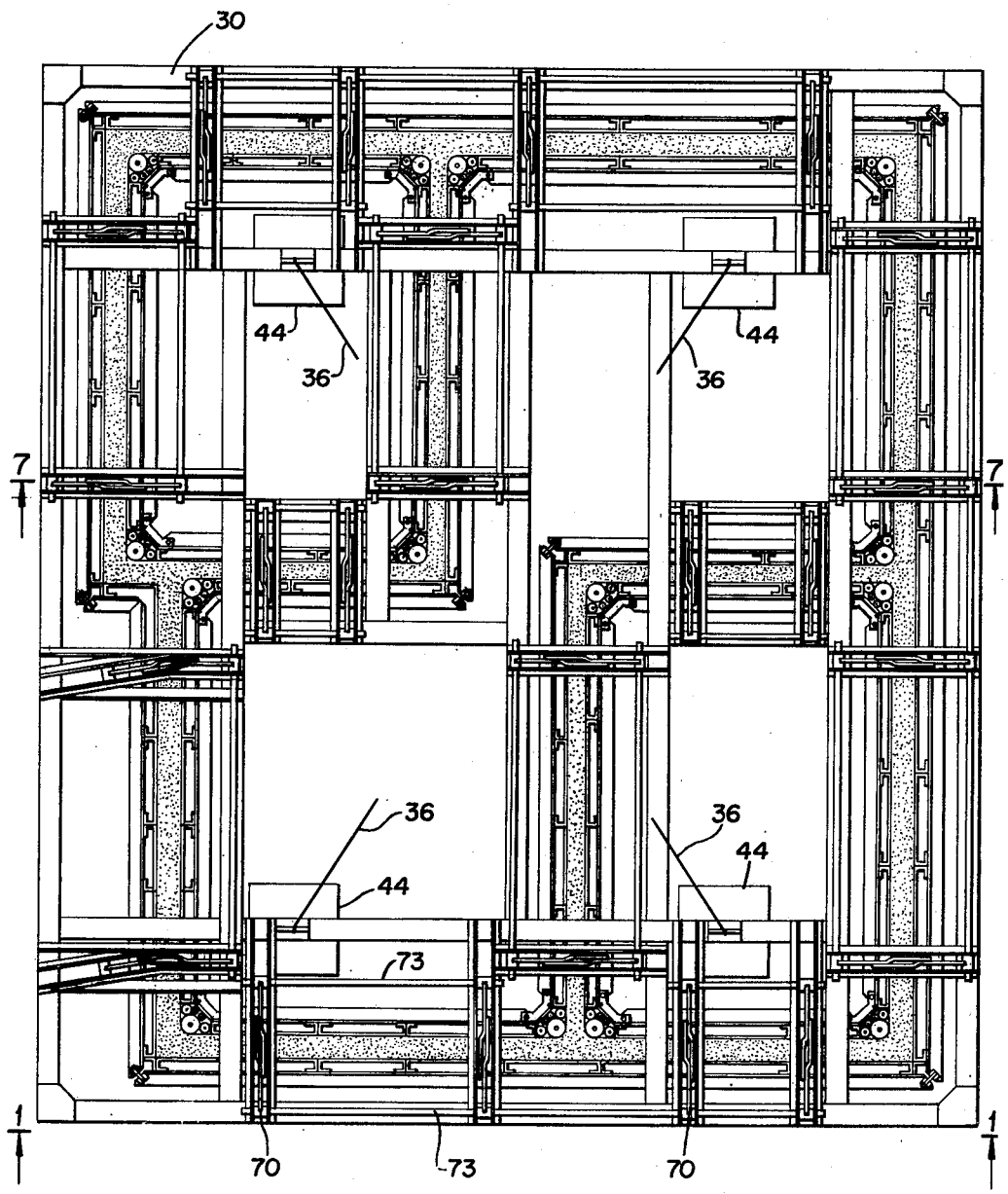

The general arrangement of the forms, and a set of concrete walls which have been cast therein, is shown in Fig. 2 as seen in plan view from above, and is shown in Figs. 3 and 4 as shown in horizontal section. The difference between Figs. 3 and 4 is that in Fig. 3 the forms are still in the casting position, while in Fig. 4 they have been stripped from the walls and are in a release or open position. The frame 30, with its cam-and-follow means and actuating means, as will be explained, determines the casting and open positions of the forms, as well as the paths of movement of the forms between these positions, and thus serves as a jig.

The operation is illustrated in Figs. 5–9, which are schematic vertical sectional views. Prior to the condition illustrated in Fig. 5, when the entire apparatus is some distance from the ground, the screw jacks are extended so that when the frame is lowered, the screw jacks will support the frame at a sufficient elevation that the bottom edges of the forms will be several inches from the ground. The crane may now be lowered to such a point that there is slack in the cables, or may be disconnected entirely.

In Fig. 5, the frame 30 together with the forms has been lowered onto a foundation slab 42, and the screw jacks 40 have been retracted or lowered sufficiently so that the forms clear the foundation and the ground by a predetermined distance, this distance being such that when the forms are closed, that is, moved to casting position, which involves a motion both inwardly and downwardly, they will rest on their bottom edges.

In Fig. 5 the levers such as 70 are all raised, and the opposed wall forms are all separated from one another; that is, they are in an open position.

The next step is to lower the levers 70, to bring the opposed inner and outer wall forms toward one another to the closed position.

At points where two separate outer forms or panels come together to form an exterior corner for the building, means are provided for fastening them together snugly after they are brought to the closed position so that they will form a good seal for the concrete which will be poured. Thus as shown in Fig. 3, the fastening means may comprise bolts 71, which are passed through aligned openings in their exterior forms, and held in place by nuts. At convex corners within the building, bolts 71a are similarly arranged; these corners, although within the proposed building, may be classified as outer corners since they are similar to the corners where the bolts 71 are located, being convex, and being characterized by the fact that their adjacent wall forms move away from one another when they are moved to the open or stripped position.

After the inner wall forms have been moved to the casting position, corner forms, generally indivated at 72 in Fig. 3, are adjusted to the casting position. These corner forms, to be described later in more detail, serve to fill in gaps between their adjacent inner wall forms and to shape the cast walls. Also, when fastened in the casting position, they interconnect the inner wall forms, and serve to hold them in place.

It may be seen that when the inner and outer wall forms are moved to the casting position under the guidance of the frame 30 and fastened by the bolts and the corner forms, being also braced by the frame, they will be accurately positioned and will conform with a wall-defining space having a predetermined configuration.

In Fig. 6, the wall forms are in closed or casting position, but no concrete has yet been poured.

After the forms are closed, the screw jacks may be further lowered slightly to make certain that at least a portion of the weight of the forms is carried by the foundation, whereby the pressure of the forms on their lower edges serve to provide a good seal to retain the concrete which will be poured into the forms.

In Fig. 7 concrete has been poured into the forms. The concrete is then allowed to set.

The corner forms are next stripped, and then the levers 70 are raised for stripping the wall forms. In Fig. 8, all the levers except the right-hand center one have been completely raised, and it will be observed that their associated wall forms have been stripped from the walls, being moved back therefrom into an open position. The right-hand center lever has been moved only part way from its "down" to its "up" position, and its wall form has been only partly stripped. It may be observed that the upper edge of the wall form is stripped or moved away from the wall before the lower edge is moved away. The reason for this action will be better understood after the details of the mechanism associated with the levers has been explained.

After all the forms have been stripped, the crane or other lifting apparatus is again employed to lift the entire frame 30 together with the forms, entirely above the walls, and the complete assembly is then transported to another site. The operation may be repeated on successive sites to cast a number of sets of walls. Roofs are applied to the walls in any suitable manner.

Referring to Figs. 1 and 2, it may be seen that with each form there may be associated a plurality of the levers 70, for operating it. In the illustrated arrangement, each form has at least two levers, one at either end, and these two levers are synchronized by means such as a shaft 73.

Figs. 3 and 4 show, in horizontal section, the forms in casting position and in open position, respectively.

*Levers for actuating forms*

Turning to Figs. 10–14, the details of the levers which control the forms via the hangers will now be explained.

In Fig. 13 there is shown a typical hanger such as 74, which performs the same function as the hanger 68 shown in Fig. 5, serving to support a form. This hanger 74 is carried by a pin 76, on which there is rotatably mounted a follower member or roller 78 which in turn is supported by a cam-like track 80, formed as the upper surface of a member 82 carried by frame members 30a. Journalled in the frame members 30a is a rock shaft 84, to which there is affixed a lever 86 of the same type as the lever 70 of Fig. 5. The lever 86 terminates at its outer end, not shown, in a handle by which it may be manually operated.

A link 88 is pivotally connected to the hanger 74, and to the lever 86. It may be seen that motion of the lever 86 in an upward direction is transmitted via the link 88 to the hanger 74, and serves to move the upper end of this hanger along a path generally determined by the shape of the upper surface 80 of the member 82, since the follower 76 moves along this surface as a cam track. In the embodiment illustrated in Fig. 13, the first part of this track is horizontal and the latter part of this track slopes upwardly, and hence the upper end of the hanger 74, and consequently the upper edge of the form, will tend to move along paths which are at first approximately horizontal and then slope upwardly. Since the bottom edge of the form is, during the initial part of the motion, held in place because it is resting on the foundation, the upper edge of the form will first be stripped away from the wall. There is thus a very slight initial pivoting movement or rotation of the form about its lower edge. This pivoting movement will be enhanced if, when the forms are closed, the follower 76 is lifted slightly above the track 80 by reason of the forms resting on the foundation. It may be noted that in order to break the adhesion between the form and the wall at the top first, there is required only a slight movement of the top part of the form away from the wall.

Another way of describing the initial motion produced by the apparatus is to say that the top of the form initially moves along a path tangential with respect to an axis through the lower edge of the form.

When the follower 78 reaches the upwardly sloping portion of the track 80, it produces a lifting action on the hanger and on the forms, and consequently the bottom edge of the form is lifted from the ground and swings over so that it hangs generally vertically.

When the lever 86 is raised, means are provided automatically to lock the mechanism in position so that the lever 86 will remain in raised position, and so that the form will not move back toward the walls. As illustrated in Fig. 13, this locking mechanism comprises a link 90 having its upper end pivotally carried by the link 88, and having on its lower end a transverse bar or pin 92 which is adapted to move along an upper surface of the frame members 30a. It may be seen that the link 90 extends from its pivot downwardly at an angle so as to slant toward the hanger 74 of the form. As shown in Fig. 14, the bar or pin 92 may extend transversely from the links 90 in both directions, and the frame members 30a may be formed to have two upper surfaces on which the pin 92 rides. The contour of an upper surface is shown in Fig. 13. This surface is generally straight and horizontal during the major portion of the movement of the pin 92 as the lever is raised, but when the lever approaches its uppermost position, the pin 92 reaches a slot 94 which is formed in the upper surface of the frame 30. The slot is illustrated as asymmetric, its side toward the hanger 74 being generally vertical, and its opposite side slanting from the bottom upwardly toward the lever 86.

As the lever 86 is raised, the pin 92 eventually reaches the slot 94, and by the action of gravity, the pin 92, together with the link 90, drops downwardly so that the pin moves into the slot. If the lever 86 is now released, the pin 92 and the link 90 will hold it in raised position, because the shape of the slot 94 and the angle at which this pin is forced into the slot by the lever will prevent the return movement of the lever.

This locking action is quite useful, since it is desirable to be able to strip all the forms, by raising the levers, and to retain the forms in stripped position indefinitely, so that the entire assembly of forms may then be lifted, by means of the crane and the movable frame 30, and moved to another site.

When it is desired once again to move one or more forms into a casting position, the operator may move the lever 86 slightly farther in the same direction as in raising it, and the pin 92 will ride up the back, slanting, side of the slot. The operator may then lift the pin 92 and its associated link 90, slightly, and lower the lever 86 until the pin 92 is on the side of the slot nearest the hanger 74. From this point on, the lever 86 may be further lowered and the pin 92 will merely ride on the upper surface of the frame members 30a.

Although the locking means illustrated has certain unique advantages, other types of locking means may also be used to advantage. For example, openings might be provided in the frame members 30a and the lever 86 which become aligned when the lever 86 is raised, and a pin might be passed through the aligned openings by the operator when it is desired to retain the lever in the raised position.

*Figure 15*

Reference is now made to Fig. 15, which is a vertical sectional view through an inner and outer form, and which illustrates certain additional features which may be employed, such as means for aiding in retaining the forms in position against the outward pressure of the plastic concrete, and an arrangement for temporarily retaining window forms in the wall forms. It will be understood that the left-hand side of Fig. 15 is toward the interior of the building, and the right-hand side is toward the exterior.

Prior to casting the walls, there will have been formed a suitable foundation which may include a horizontal foundation slab 96, and a footing 98, which, like the walls which are to be formed, may be of concrete or other settable plastic building material. The upper surface of the footing 98 is illustrated as being provided with a channel 100 of rectangular cross section. When the concrete wall 102 is formed on the footing, it will extend downwardly into the channel 100, whereby the wall is keyed into the footing, for mechanical rigidity, and also to aid in providing a seal against moisture. The various walls such as 102 may be formed of an insulating type of concrete. It may also be noted that the horizontal foundation slab 96 rests on the footing 98, and the wall 102 extends downwardly below the upper surface of the foundation slab 96, so as to insulate the slab, and also to prevent the entrance of moisture from outside the building onto the upper surface of the foundation slab.

In Fig. 15, the inner form may be designated as 106 and the outer form as 108. The nature of the faces 60 is the same as that described in connection with Fig. 5, being assumed, in this illustration, to be of metal.

The forms hang from the frame members 30a of the movable frame by hangers 110 and 112.

Certain of the forms, for example, the form 108, are provided with a rubber member 113 which runs along their lower edges. When the form is in casting position, it presses this rubber member downwardly against the footing so as to help prevent fluid components of the plastic concrete from leaking out.

Means will now be described for aiding in retaining the forms in position against the hydrostatic pressure of the plastic concrete. As part of such means, there is shown in Fig. 15, on the outer side of the outer form 108, a horizontal waler 114. This waler is provided with an aperture at 116 through which there may be passed a wedge 118. A tapered tie 120 may be inserted through the forms prior to casting the wall, and this tie 120 has an aperture 122 which may be aligned with the aperture 116, whereby the wedge 118 may be passed downwardly through both these apertures. The wedge 118 is provided with a shoulder 124 which strikes a transverse reinforcing member 126 of the waler 114.

On the side of the inner form 106 toward the interior of the building, there is provided a generally similar horizontal waler 128 and a wedge 130. The waler 128 has a stop 132, and the tie 120 carries a tab 134 which cooperates with this stop to determine the maximum extent to which the tie 120 may be inserted. The left-hand end of the tie 120 has a handle 136 which may be used when it is necessary to remove the tie.

It will be understood that prior to casting a wall, the forms are swung into a casting position by lowering the levers which control them. The tie 120 is inserted until the tab 134 strikes the stop 132. The wedge 130 is then inserted and then the wedge 118 is inserted. The tie 120 and the associated means for securing same serve to hold the forms together in resisting the pressure head which will exist when the plastic concrete is poured.

Window forms

In a preferred embodiment of the present invention, openings for windows and doors are formed at the same time the walls are cast. In some cases, permanent window frames may be cast in place, and allowed to remain there. In other cases, temporary window forms may be inserted between the wall forms, the walls cast, the wall forms removed, the window forms then removed, and later permanent window frames may be inserted in the window openings. It may be assumed that this later method is employed in the illustrated embodiment.

Reference is now made to Figs. 15 through 19, inclusive. The wall forms are provided with openings for windows and doors, a window opening being shown in these figures. In this embodiment, at some time before the forms are completely closed, a window form is inserted between the wall forms. The window form comprises an inner window form 138 and an outer window form 140. The outer window form 140 may first be attached to the inner window form 138, as by butterfly nuts 141 and associated bolts 143, these bolts being pivotally carried by the inner window form 138 and being adapted to be swung into place so as to extend through aligned slots in the window forms 138 and 140. The inner window form 138, carrying the outer window form 140, is then attached to the inner wall form 106, by means to be described subsequently. The edge of the inner window form next to the form 106 is provided with a rim 142. The outer window form is provided with a generally similar rim 144. These rims project into the space between the wall forms, whereby when the wall forms are forced toward one another, they tend to grip the window forms.

There are several reasons for constructing the window forms in two sections. By constructing them in two sections, stripping them from the concrete walls is easier, because the surface of contact with the concrete is less for each of the sections than it would be if a combined window form were used. Moreover, each section is lighter and therefore easier to handle than would be a combined window form. Also, by employing two sections, and stripping the sections in opposite directions, it is possible to give the window openings any desired shape, as seen in a sectional plane perpendicular to the wall. Thus the window openings may be slightly recessed at either face of the wall, by using window forms having rims such as 142 and 144. It will be noted that, as illustrated, the outer window form is somewhat larger than the inner window form in the region where they come together, so as to provide a recessed region. After the walls are completed, a window frame or casement may be inserted into this last-mentioned recessed region. The lower part of the outer window form tapers downwardly toward the outside of the building, to facilitate stripping and to provide proper drainage of rainwater. The upper surface of the inner window form tapers upwardly, toward the interior of the building, to facilitate stripping. As a result, the outer window form may be stripped by removing it in an outward direction, and the inner window form may be stripped by removing it in an inward direction.

Means will now be described for retaining the window forms in place. At the upper and lower edges of the window opening in the inner form 106, there are provided angle-iron members 146 and 147, respectively. Pivotally carried by and extending through the vertical portion of the upper angle-iron 146 is a locking device 148. This device is provided with suitable shoulder members, pins or the like on either side of the angle-iron so that it is adapted for pivotal motion. Toward its inner end, that is, its left-hand end as shown in Fig. 16, the locking device 148 is bent over to form a handle. Its other end, on the other side of the angle-iron 146, carries a finger 150 extending in a direction perpendicular to the axis of rotation of the locking device, and in a direction approximately opposite the direction in which the handle is bent. The finger 150 clears the angle-iron 146 by a distance approximately equal to the thickness of the window form 138 which will be inserted at that point.

The locking device 148 is adapted to be rotated between a "lock" position, in which the handle extends downwardly and the finger extends upwardly, and a "release" position in which the handle extends upwardly and the finger extends downwardly. The device is shown in the lock position in Figs. 16 and 18. It is shown in the release position in Fig. 19.

To assist the operator in positioning the device at the release position, there is provided a stop 152 which extends from the angle-iron 146 into the path of the locking device 148. The handle end of the locking device is heavier than the finger end; and when the locking device is in the lock position, gravity tends to hold it in that position by holding the handle down. The position of the stop 152 is at an elevation above the axis of rotation of the locking device 144, but it is laterally displaced slightly from a vertical plane passing through this axis, as may be seen in Figs. 18 and 19. As shown in Fig. 19, when the locking device is turned from the lock position to the release position it will pivot through slightly more than 180°, and the pull of gravity against the handle 148 will tend to hold the handle against the stop 152, and thereby hold the device in the release position.

Prior to placing the window form 138 in position, the locking devices such as 148 are turned to the release position. When the wall forms are at least partially open, the window form 138 is positioned at the window opening of the wall form 106. The locking device such as 148 is then turned to the lock position. The window forms have an edge such as 154, and the finger 150 passes on the side of the edge 154 opposite the angle-iron 146, thereby holding the window form 138 in place, at the top. A somewhat different means is employed to secure the window form 138 at the bottom. As shown in Figs. 16 and 17, the window form 138 has a threaded bolt 156 pivotally attached to a web 158 of the window form 138. The angle-iron 147 and also the window form 138 have slots, aligned with this bolt, and this bolt may be swung into place so as to pass through both these slots. A butterfly nut 158 on the threaded bolt 156 holds the bolt and the window form in place.

By way of summary, prior to affixing the inner window form 138 to the inner wall form 106, the outer window form 140 is affixed to the inner window form by the pivoted threaded bolts 143 and butterfly nuts 141. The combined window forms are then inserted between the wall forms and the window form 138 is affixed to the wall form 106. The wall forms may now be brought together against the window forms. Since the wall forms are firmly pressed against the window forms, the window forms serve to seal up the openings in the wall forms so that the concrete is retained.

Door openings are formed in the cast walls in a manner generally similar to the formation of window openings, with the aid of door forms inserted between the wall forms. A door form is illustrated as 159 in Fig. 3. Such forms may extend downwardly to the floor level.

There has already been described, in connection with the tie bolt 120, one means for aiding in holding the forms together. A somewhat different arrangement is shown in Fig. 15 in connection with a tie bolt 160. This tie bolt is provided at its right-hand end with a threaded extension, and a nut 162 may be tightened on this threaded extension to press the wall form 108 toward the window forms and toward the wall form 106. On the interior of the wall form 106, there is provided a wedge 164 which operates in a manner generally similar to the wedge 130 already described. A handle 166 is located at the left-hand end of the tie bolt 160, for use in removing the tie after the walls are cast.

A still different type of tie 168 is shown in Fig. 15 extending through the window opening. This tie is pivotally attached at its right-hand end to a downwardly-extending portion of a horizontal waler 170. At its left-hand end it may be swung into a horizontal position through a slot in a downwardly extending portion 172 of a horizontal waler 174. The tie 168 is threaded at its left-hand end, and a nut 176 may be tightened against the portion 172 in order to press the wall forms toward one another.

In Fig. 17 there is shown an opening or inspection window 178 in the inner window form. One purpose of this opening is to allow an operator to ascertain whether the concrete has completely filled the space under the window form, during a pouring operation. Another purpose is to let out any air which might otherwise tend to become entrapped in the space below a window form.

*Corner forms*

The length of the inner wall forms or panels in a horizontal direction is, in general, less than the corresponding length of the walls which are to be cast. This feature may be observed in Fig. 4, for example, where the horizontal length of the form 180 may be observed to be less than the horizontal length of the interior wall surface 182, to which it is opposed. The same is true of other inner wall forms such as 184, 186 and 188 with respect to the wall surfaces to which they are opposed. The purpose of this arrangement is to allow these wall forms to be moved away from the respective wall surface without interfering with one another. As a result of this arrangement, however, when the inner wall forms are moved to a casting position, there would exist gaps at the corners between them, if provision were not made to fill in these gaps. There will be disclosed herein several variations of means for filling in these gaps, such means being referred to as corner forms. In the embodiment shown in plan and sectional views in Figs. 2–4, there is illustrated an inflatable type of corner form. Details of this type of corner form are shown in Figs. 20, 21, and 22. A second type of corner form is shown in Figs. 23 and 24. A third type of corner form is shown in Fig. 25.

The inflatable type of corner form, shown in Figs. 2–4 and 20–22 will first be described. This corner form includes an outer sheath or cover member 190, of rubber, canvas or the like, permanently attached to its associated forms 184 and 186, as by brackets 192 and 194, which engage beads or enlarged edges 196 and 198 of the sheath. The sheath 190 need not necessarily be airtight, but should be of flexible, collapsible material. This sheath partly encloses a series of bladders or inflatable, collapsible cylinders 202—206, inclusive, of rubber or the like. In a variation, not shown, the sheath 190 may extend entirely around the bladders, as viewed in horizontal section, so as to embrace them on the inside as well as on the outside.

The bladders may be supported at their upper ends by suitable means, for example a sheet of flexible material 207, which may be attached to the two adjacent forms 184 and 186. The valve stems of the bladders extend upwardly through the flexible sheet 207, being held in place by nuts or the like. The bladders are self-supporting when inflated, but when deflated, the sheet 207 helps to support them and to retain them in their proper relative positions. The bladders are braced on the inner side of the forms by a door-like brace 209, which is hinged to a portion of the wall form 184. The door-like brace 209 is, in turn, braced by a series of brace members 209a, 209b and 209c, which are individually pivoted on portions of the wall form 186 and are adapted to be fastened to the wall form 184.

A feature is shown in Figs. 21 and 22 which may be employed, regardless of what type of corner form is used, namely, means for locking the bottom edges of the adjacent wall forms together after they have been moved to the stripped position. For this purpose, the forms may be provided with extensions such as 210, shown in Fig. 21, having a vertical opening 210a therethrough. When the forms are moved to the stripped position, the openings 210a of the adjacent forms become aligned, and a pin 211 may be inserted therethrough. This arrangement prevents the forms from swinging unduly when the entire assembly is being transported from one site to another.

The operation of the inflatable corner forms is as follows. It may be assumed that the inner wall forms are initially in an open or stripped position, as illustrated in Fig. 22. The bladders 202—206 have previously been deflated, and the sheath 190 is collapsed. The door-like brace 209 has been swung back against the form 184, and the members 209a, 209b and 209c have been swung back against the form 186, as shown in Fig. 22. The wall forms such as 184 and 186 are next moved to a closed or casting position, that is, in the direction of the arrows shown in Fig. 22. There is ample slack in the sheath 190 to permit this movement. The door-like brace 209 is now pivoted in a clockwise direction until it assumes the position shown in Fig. 21. The members 209a, 209b and 209c are swung in a counterclockwise direction until they assume the positions shown in Fig. 21, and are locked in this position by inserting pins through suitable aligned openings in these members and in the form 184. The bladders are now inflated. They will stretch the sheath 190 until it has approximately the contour shown in Fig. 21. The concrete is then poured, and the arrangement will be as illustrated in Figs. 2, 3, 20 and 21. After the walls are set, the bladders are deflated. The members 209a, 209b and 209c are now disengaged from the form 184. They are swung in a clockwise direction and the door-like brace 209 is swung in a counterclockwise direction, so that they assume the position shown in Fig. 22. The inner forms may be stripped from the walls, and as they are moved away from the walls, they will strip the sheath 190 from the walls if it still adheres thereto. It will be observed in Fig. 22 that such a corner form tends to produce a configuration for the interior corners of the walls which has a circular, arcuate shape. Also, when the form is inflated, the sheath 190 presents a smooth unbroken surface as an extension of the wall form, thereby forming an unbroken surface for the concrete wall. Moreover, the operation of the inflatable corner form cannot be interfered with by the adhesion of particles of dried concrete.

The second type of corner form, such as that illustrated in Figs. 23 and 24 will now be described. In these figures there are shown interior wall forms 212 and 214.

Pivotally mounted on the wall form 214 at an axis 215 is a corner form proper 216. In Fig. 23 the forms 212 and 214 and the corner form 216 are in casting position, the corner form filling the gap between the wall forms. In Fig. 24 the wall forms are in a stripped or retracted position, and the corner form 216 has been swung in a clockwise direction with respect to the wall form 214. It may be observed in Fig. 23 that when in casting position the corner form presents a casting surface 216a which extends diagonally at a 45° angle across the proposed corner, and also presents additional casting surfaces 216b and 216c generally in alignment with the wall forms 212 and 214.

Suitable means are provided for retaining the corner form in casting position. For this purpose it carries a plate 218 provided with slots 220 and 222. A brace plate 224 is carried by a plate 226, which in turn is pivotally mounted on a portion of the wall form 212. After the corner form 216 is swung into casting position, the plate 224 is swung in a clockwise direction so that it lies beneath the plate 218. The plate 224 is provided with slots 228 and 230 which will then be aligned with the slots 220 and 222 of the plate 218. Suitable pins may then be inserted through the slots in the plates 218 and 224. Pivotally carried by a portion of the wall form 214 is another brace plate 232 having a vertical opening 234 therethrough. When the forms are in stripped position, the plate 232 is in the position shown in Fig. 24. When the forms are in casting position, the plate 232 is swung in a counterclockwise direction until it assumes the position shown in Fig. 23. In this position, it lies above the plate 224. The plate 224 is provided with an opening 236 with which the opening 234 becomes aligned when the forms and plates are in casting position. A suitable pin is then inserted through the openings 234 and 236. The corner form 216 will then be locked in position, since the plate 232 retains the plate 224, and the plate 224 in turn retains the plate 218.

A third type of corner form, such as that illustrated in Fig. 25, will now be described. In this figure there are shown interior wall forms 238 and 240, and a corner form 242. This corner form when in casting position, as shown in Fig. 25, presents a casting surface 242a which extends diagonally at a 45° angle across the proposed corner, and also presents additional casting surfaces 242b and 242c generally in alignment with the effective surfaces of the wall forms 238 and 240. The corner form 242 is hinged to the wall form 240 at an axis 244 in the region where the surface 242b meets the wall form 240. This arrangement is somewhat different from that of Fig. 24, in which the axis 215 is not in the immediate vicinity of the junction between the surface 216c and the wall form 214, but is to the contrary displaced somewhat in a direction away from the corner form.

The corner form 242 of Fig. 25 may be actuated by a plunger or handle 246, coupled to the corner form 242 via a link 248 which is pivotally attached to both the corner form and the plunger 246.

For retaining the corner form 242 in casting position, there is provided a plate 250, pivotally mounted at an axis to 252 on a horizontal waler 254 of the wall form 240. When the corner form is moved to the casting position, the plate 250 may be swung into the position shown in Fig. 25, and fastened in this position by pins 256 and 258 which may be passed through suitable aligned openings in a horizontal waler 260 of the wall form 238, and a pin 262 through similar aligned openings in the waler 254 of the wall form 240. A pin 263 is then passed through aligned openings in the plate 250 and the handle 246.

In stripping, the plate 250 is first unfastened and swung back against the wall form 240. The corner form 242 is then stripped with the aid of the handle 246, and swung back in a counterclockwise direction toward the wall form 240. The wall forms 238 and 240 may then be stripped without interfering with one another.

*Cam of Fig. 26*

A variation in the cam by which the wall forms are supported is shown in Fig. 26. In this variation, follower members such as 264 are carried in cam slots such as 266. These cam slots are slanted downwardly from the casting position toward the stripped position. In stripping the forms, the upper edges of the forms are first moved a small distance outwardly and downwardly by pivoting the forms about their lower edges, so as to strip the upper edges first. The cam slot 266 is shaped to allow this pivoting motion. It may be either straight or curved, but if straight, the slot should be large enough in relation to the size of the follower 264 and should extend at such an angle as to allow the follower to move along a circular arc. Since the upper edge of the form moves along a circular path centered at the lower edge of the form, the motion of the upper edge at any instant, including its initial motion, may be described as tangential with respect to an axis through the lower edge. The instantaneous tangential motion will, at the moment of stripping, be horizontal.

After the upper edges of the forms are stripped, the entire frame, a portion of which is represented by the numeral 268 in Fig. 26, is lifted upwardly a short distance, and the lower edges of the forms will swing away from the cast wall into approximate alignment with their upper edges, thereby completing the stripping operation.

No levers for actuating the forms are shown in Fig. 26. Suitable actuating means may be provided, or the forms may be moved inwardly and outwardly by the operator, who may manually grasp their hangers and exert force.

Cam of Fig. 27

Fig. 27 illustrates the arrangement in which the cam slot 270 is shaped in the form of a circular arc about the axis 272 through the lower edge of the form.

While there has been described an illustrative type of frame and means for supporting the wall form from the frame, considerable variations may be made. Thus while a particularly advantageous structure is provided by an embodiment in which the upper edges of the wall forms hang relatively directly, via hangers, from cam tracks above them on the frame, it would be possible movably to support the wall forms from the frame by other means. In some cases it might be found desirable to provide a plurality of movable supports at different elevations for each of the wall forms or panels, and a cam track or other means for guiding each of the movable supports. Also, other types of mechanical linkages between the forms or panels and the frame might be employed. Variations are also possible in the means for moving the wall forms along their predetermined paths. Thus pneumatic or hydraulic means might be employed for this purpose.

It may be seen that the present invention may advantageously be applied to the simultaneous casting of a set of external walls which in plan view define a closed geometric figure, for example, a rectangle, with or without internal partitions. The assembly of inner and outer wall forms and corner forms is generally arranged in the configuration of a double-walled box, both when the forms are in casting position and when they are in stripped position. When in casting position, the corners of the double-walls are closed. When in stripped position the corners are slightly open. The forms in which inner partitions are cast may be considered to comprise additions to the double-walled-box structure. In some cases, where the partitions define rooms within the building, these last-mentioned forms themselves assume the configuration of a double-walled-box having one or more common sides with the double-walled-box which defines the space in which the outer walls for the building are cast.

Certain of the advantages of the present invention result from the fact in stripping the forms, when the forms are moved away from the cast walls and upwardly to the stripped position, they are maintained in substantially the same floor-plan arrangement as when they are in casting position, being merely opened up without being disassembled, whereby they may be transported to another site in this arrangement and whereby they may be readjusted to casting position by a simple closing operation.

While the apparatus and method described herein have been illustrated as applied to a single-story structure, and while they will probably be used most frequently in constructing such structures, the invention is not necessarily limited to such uses. Thus there may be cast on a foundation slab a first set of walls, a ceiling-and-floor slab may be applied to the top of these walls, and another set of walls may then be cast on the last-mentioned slab, thereby producing a two-story structure.

Summary of operation

For constructing a series of buildings, the sites for the desired buildings are first leveled. These sites may be near one another, in some cases, being located along a street or roadway. Footings and foundation slabs are formed on each of the sites. The wall-casting machine, including the movable frame 30, with its depending wall forms, is then suspended over a first site, as by a crane. The frame is lowered until it rests on its screw jacks 40, which are in extended position when the frame is first lowered. Prior to lowering the jacks the wall forms are all in open position; that is, the levers 70 which control them are in the up position, and locked in place. The jacks are then operated to lower the frame 30 sufficiently so that the lower edges of the wall forms just clear the foundation, when the forms are open, and so that when the forms are closed their lower edges will touch the foundation.

Door and window forms are then inserted and attached to one of the opposed wall forms.

The levers 70 are then unlocked, and the wall forms are swung into the casting position. They are then pulled together by tie members, and they press against the window forms. The inner corner forms are then actuated to the casting position. In case inflatable corner forms are used, their bladders are inflated, and brace plates are swung into place and locked. The screw jacks may be lowered slightly farther so that the forms rest somewhat on their lower edges. Concrete is then poured into the wall forms, preferably in a single casting operation. This may be accomplished by feeding concrete to a central point above the forms, where it is distributed through one or more movable chutes or conduits to the tops of the openings defined by the wall forms. If desired, the setting of the concrete may be hastened by applying a vacuum thereto. The plastic concrete may also be vibrated, as by attaching a vibrating apparatus to the wall forms or by inserting a vibrating element into the concrete itself.

After the concrete has set sufficiently so that the walls are self-sustaining, window forms are detached from the wall forms, and the corner forms are stripped. If an inflatable inner corner form is employed, its bladders are deflated, and its brace plates are swung into a retracted position. The wall forms are then stripped, by raising the levers which control them. With respect to any particular wall form, it is desirable to apply the stripping force approximately uniformly along the upper edge of the form. In some cases this may be accomplished by having a plurality of levers and operating the levers simultaneously. The levers may be synchronized by a rod or other mechanical link connecting them.

In the stripping operation, the upper edges of the forms are first moved away from the walls, and thereafter moved upwardly. This movement may in some cases be entirely controlled by cam tracks which suspend the wall forms. In other cases the cam tracks may provide the initial outward movement, and the later upward movement may be provided by a small upward movement of the movable frame.

After the wall forms have been completely stripped, they will then be hanging from the movable frame, with their lower edges above the foundation, or the nearby ground. The movable frame, together with the wall forms suspended therefrom, is lifted from the cast walls, and transported to another site, where the operation is repeated.

The door and window forms are stripped from the first set of walls after the wall forms are removed. A duplicate series of window forms may be used in casting a second set of walls while the first series is still in use.

After the walls are cast, roofs are applied in a suitable manner and window and door frames or casements are inserted into the walls.

While a suitable form of apparatus and method to be used in accordance with the invention have been described in some detail, and certain modifications have been suggested, it will be understood that numerous changes may be made without departing from the general principles and scope of the invention.

I claim:

1. A self-supporting machine for casting directly on a series of sites complete sets of at least external walls for buildings, comprising a generally horizontal frame at an elevation above the top of the desired walls, vertical supports permanently affixed to said frame and extending downwardly therefrom for supporting same on a site, a complete set of generally vertical panels for simultaneously casting complete sets of at least external walls for one of said buildings in situ, said panels comprising a plurality of inner and a plurality of outer panels, there being at least one panel for each interior and each exterior face of said complete set of walls, guilding means including cam tracks and followers suspending each of said panels from said frame and limiting the motion of the upper edges of said panels, said guiding means being adapted to allow the upper edges of said panels to be moved toward one another to a casting position and apart to an open position but to maintain each said upper edge always parallel to the face of the corresponding proposed wall opposed to said edge, actuating means interconnecting said panels with said frame and serving to move said panels to said casting and open positions, and means on said frame for connecting a lifting device to said frame, whereby said frame, said panels connected thereto and said vertical supports may be lifted as a single, integral assembly, and may be set onto successive sites for buildings, for casting complete sets of walls directly thereon.

2. A self-supporting machine for casting on different sites complete sets of at least external walls for buildings, comprising a generally horizontal frame at an elevation above the top of the desired walls, vertical supports permanently affixed to said frame and extending downwardly therefrom for supporting same on a site, means for varying the effective lengths of said vertical supports, a complete set of generally vertical panels depending from said frame, there being at least eight of said panels, one for each interior and exterior face of said complete set of walls, and means including cams, followers, and actuators permanently connecting the upper edges of said panels with said frame, said cams being shaped to permit said panels to be moved toward one another to a casting position and moved apart to an open position for stripping along such predetermined paths that in an initial portion of said stripping motion said panels rotate freely outwardly about their bottom edges without any lifting action but during a subsequent portion of the stripping motion the upper edges of said panels are lifted with respect to said frame and said lower edges of said panels are allowed to swing outwardly, said frame, panels, and supports being interconnected in a unitary manner whereby said frame may be lifted, with said supports and panels depending from and attached to it, and moved as a single assembly to successive sites, whereby complete sets of walls may be simultaneously cast in situ.

3. A machine for casting walls for buildings on successive sites, comprising a movable platform which may be lifted, transported and lowered, supports affixed to said platform for supporting it when it is lowered onto said site, a plurality of inner panels and a plurality of outer panels opposed thereto, members carried by said platform having surfaces in the form of cam tracks running in directions generally transverse to the proposed walls, the initial portion of each cam track toward the end thereof near the corresponding proposed wall being appoximately horizontal and the subsequent portion sloping upwardly in a direction away from said proposed wall, follower members adapted to cooperate with said cam tracks, hanger members interconnecting said follower members and said panels, there being at least two such cam tracks and associated follower members and hangers for each said panel, actuating levers pivotally attached to said platform, and links interconnecting said levers and hanger members and pivotally attached to each of same, said cam tracks being adapted to permit movement of said opposed panels toward one another to a casting position and apart to a stripped position in accordance with the motion of said levers, said panels and said supports being of such relative length in a vertical direction that when said apparatus is in a casting position said follower members are disengaged from said cam tracks, whereby during the initial portion of a stripping operation said panels rotate outwardly about their bottom edges until said follower members engage said cam tracks, and thereafter during said stripping operation said follower members are moved outwardly and upwardly so as to lift said panels with respect to said frames and to swing the lower edges of said panels away from the cast walls.

4. A machine for casting sets of walls for buildings on successive sites, comprising a movable platform which may be lifted, transported and lowered, supports affixed to said platform for supporting it when it is lowered onto said site, a plurality of inner panels and a plurality of outer panels respectively opposed to said inner panels, members carried by said platform having surfaces in the form of cam tracks running in directions generally transverse to the proposed walls, the initial portion of each cam track toward the end thereof near the corresponding proposed wall being approximately horizontal and the subsequent portion sloping upwardly in a direction away from said proposed wall, follower members adapted to cooperate with said cam tracks, hanger members interconnecting said follower members and said panels, there being at least two such cam tracks and associated follower members and hangers for each said panel, and actuating means for moving said opposed panels together to a casting position and apart to a stripped position in accordance with movement permitted by said cams.

5. A wall casting machine comprising a generally horizontal frame serving as a jig, vertical supports permanently affixed to said frame and extending downwardly therefrom for supporting same on a site, said supports having means for varying their effective length, a plurality of inner panels and a plurality of outer panels opposed thereto, said panels being generally vertical and arranged to define an interconnected space in which a complete set of at least external walls for said buildings may be cast, followers connected to said panels, members carried by said frame having openings therein for receiving said followers, cam surfaces forming at least a portion of the lower boundaries of said openings, said cam surfaces running in directions generally transverse to the proposed walls and having upwardly sloping portions positioned to guide said followers along upwardly sloping paths during the latter portion of each stripping operation, said openings being of sufficient size near the ends of said cam surfaces toward said proposed walls to enable said followers to be disengaged from said cam tracks during the initial portion of each stripping operation, said supports being short enough that when said apparatus is placed in a casting position on a site and said panels are lowered so as to rest on said site said followers are lifted above and disengaged from said cam surfaces, and a series of actuators for forcing the upper edges of said panels away from said walls during stripping operations, whereby during the initial portion of a stripping operation said panels rotate outwardly freely about their bottom edges with said followers disengaged from said cam surfaces, but upon subsequent stripping motion said followers engage said cam surfaces and are thereafter forced along upwardly-sloping portions of said cam surfaces, so as to lift said panels with respect to said frame and to swing the lower portions of said panels outwardly.

6. A machine for casting sets of building walls directly on permanent building sites, comprising a generally horizontal frame, at least four inner and at least four outer panels all depending from said frame, said panels being arranged in a double-walled configuration, inner corner forms each comprising a sheet of flexible material permanently interconnecting said inner panels, and guiding means, including cam tracks and followers, suspending each of said panels from said frame and limiting the motion of said upper edges of said panels, adapted to allow said panels to be moved toward one another to a casting position but apart to an open position, while always remaining parallel to one another and connected to said frame.

7. Apparatus for use in casting a set of walls for a building, comprising a movable frame adapted to be positioned above sites where walls are desired, opposed wall forms, and means including a cam track and a follower suspending each of said wall forms from said frame, said cam track including an initial portion in the shape of a circular arc about an axis through the lower edge of its form adapted to rotate said form about its lower edge during the initial portion of a stripping operation.

8. Apparatus for use in casting a set of walls for a building, comprising a movable frame adapted to be positioned above sites where walls are desired, opposed wall forms, and means including cam tracks and followers suspending each of said wall forms from said frame, the initial portions of said cam tracks which are traversed by said followers during the initial portion of a stripping operation sloping continuously downwardly in an approximately straight line in a direction away from the proposed wall and being adapted to allow said forms to rotate outwardly about their bottom edges during the initial portion of a stripping operation.

9. Apparatus for use in casting a set of walls for a building, comprising a movable frame adapted to be positioned above sites where walls are desired, opposed wall forms, and means including cam tracks and followers suspending each of said wall forms from said frame, the initial portion of each cam track toward the end thereof near the corresponding proposed wall being approximately horizontal and the subsequent portion sloping upwardly in a direction away from said proposed wall.

10. A machine for casting directly on a series of sites complete sets of at least external walls for buildings, each set being cast in a single casting operation, comprising a generally horizontal frame, means affixed to said frame for supporting same at an elevation above the tops of the desired walls, said frame having horizontal portions serving as a platform on which workmen may stand, a complete set of generally vertical panels for simultaneously casting complete sets of at least external walls for one of said buildings in situ, each of said panels extending in a vertical direction a distance at least as great as the height of said proposed walls, said set of panels comprising a plurality of inner and a plurality of outer panels, there being at least one panel for each interior and each exterior face of said complete set of walls, guiding means carried by said frame including cam tracks and followers suspending each of said panels from said frame and limiting the motion of the upper edges of said panels, said guiding means being adapted to allow the upper edges of said panels to be moved toward one another to a casting position and apart to an open position but to maintain each said upper edge always parallel to the face of the corresponding proposed wall opposed to said edge, actuating means interconnecting said panels with said frame and serving to move each of said panels with respect to said frame to said casting and open positions, means for interconnecting adjacent panels at corners where they come together when in a casting position, and means on said frame for connecting a lifting device to said frame, whereby said frame and said panels for said complete set of walls connected thereto may be lifted as a single, integral assembly, and may be set onto successive sites for buildings, for casting complete sets of walls directly on each site in a single casting operation.

EMIL H. PRAEGER.

REFERENCES CITED

The following references are of record in the file of this patent:

UNITED STATES PATENTS

| Number | Name | Date |
|---|---|---|
| 1,009,848 | McArthur | Nov. 28, 1911 |
| 1,170,430 | Dunn | Feb. 1, 1916 |
| 1,398,209 | Van Bavegem | Nov. 22, 1921 |
| 1,679,040 | Lake | July 31, 1928 |
| 1,881,971 | Roedig | Oct. 11, 1932 |
| 2,096,159 | Brynoldt | Oct. 19, 1937 |
| 2,334,804 | Atterbury | Nov. 23, 1943 |
| 2,548,343 | Brown | Apr. 10, 1951 |